US008711385B2

(12) United States Patent
Tsujimoto

(10) Patent No.: US 8,711,385 B2
(45) Date of Patent: Apr. 29, 2014

(54) IMAGE FORMING APPARATUS AND SYSTEM CONNECTABLE WITH AN AUTHORIZATION APPARATUS VIA A COMMUNICATIONS NETWORK, THE IMAGE FORMING APPARATUS COMPRISING AN APPARATUS CONTROL SECTION, AN INITIAL INQUIRY SECTION, A CHANGE DETECTION SECTION, AND A RE-INQUIRY SECTION

(75) Inventor: Kunihiko Tsujimoto, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 162 days.

(21) Appl. No.: 13/313,767

(22) Filed: Dec. 7, 2011

(65) Prior Publication Data

US 2012/0147412 A1 Jun. 14, 2012

(30) Foreign Application Priority Data

Dec. 10, 2010 (JP) ................................ 2010-276043
Nov. 25, 2011 (JP) ................................ 2011-258317

(51) Int. Cl.
*G06F 15/00* (2006.01)

(52) U.S. Cl.
USPC ............. 358/1.14; 358/1.13; 399/79; 399/82; 705/52; 705/54; 705/57

(58) Field of Classification Search
CPC .................................. G06F 3/1239; G06F 3/12
USPC .......... 358/1.13–1.18; 705/52, 57, 54; 399/79
See application file for complete search history.

(56) References Cited

U.S. PATENT DOCUMENTS

| 6,202,092 | B1 * | 3/2001 | Takimoto ...................... 709/225 |
| 8,179,559 | B2 * | 5/2012 | Sawada .......................... 358/1.2 |
| 8,195,061 | B2 * | 6/2012 | Jo .................................... 399/82 |
| 8,345,276 | B2 * | 1/2013 | Kurozasa ..................... 358/1.14 |
| 8,351,058 | B2 * | 1/2013 | Igarashi ........................ 358/1.14 |
| 8,422,044 | B2 * | 4/2013 | Miyashita .................... 358/1.14 |
| 2005/0078332 | A1 * | 4/2005 | Brown .......................... 358/1.14 |
| 2005/0275868 | A1 * | 12/2005 | Higashiura et al. .......... 358/1.14 |
| 2008/0094657 | A1 * | 4/2008 | Ikegami et al. .............. 358/1.15 |
| 2009/0066995 | A1 * | 3/2009 | Mukund et al. .............. 358/1.15 |
| 2010/0079800 | A1 * | 4/2010 | Muto ............................ 358/1.15 |

FOREIGN PATENT DOCUMENTS

| JP | 2004-102356 A | 4/2004 |
| JP | 2006-088382 A | 4/2006 |
| JP | 2006-259608 A | 9/2006 |
| JP | 2008-186101 A | 8/2008 |

* cited by examiner

*Primary Examiner* — Dennis Dicker

(74) *Attorney, Agent, or Firm* — Edwards Wildman Palmer LLP; David G. Conlin; Edmund J. Koundakjian

(57) ABSTRACT

An image forming apparatus transmits to an authorization apparatus, in executing a job, condition information related to a process to be performed to a $1^{st}$ page of the job, to obtain a processable number of sheets. When the condition information changes while the job is being executed, the image forming apparatus transmits to the authorization apparatus (i) the changed condition information and (ii) information of the number of sheets being processed based on a current condition information prior to the change in condition information, to inquire and obtain a processable number of sheets based on the changed condition information. Furthermore, while the job is executed, if the processed number of sheets meet the processable number of sheets obtained from the authorization apparatus, the image forming apparatus forbids the process to be performed to a new recording sheet and stops the job.

5 Claims, 13 Drawing Sheets

F I G. 6
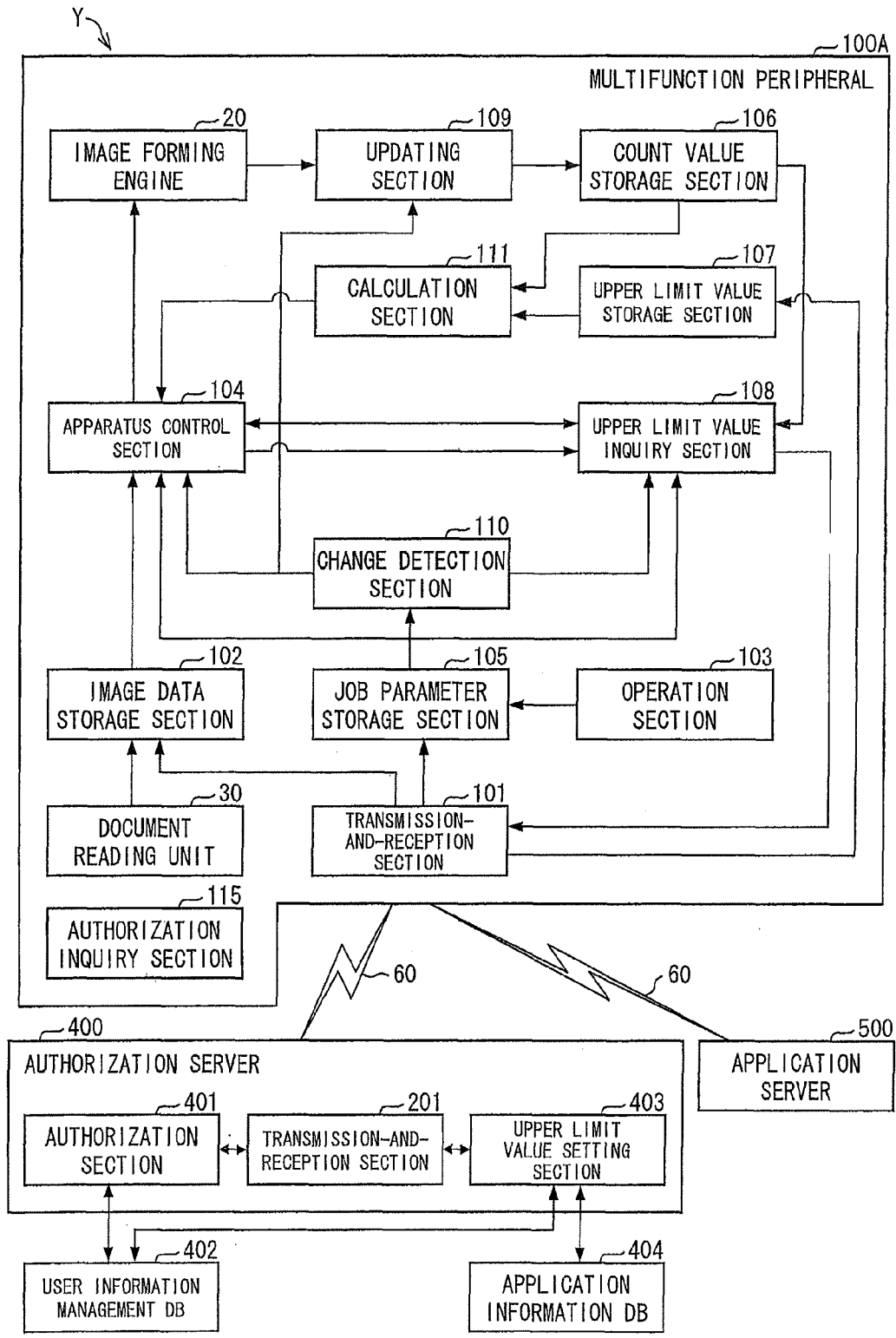

FIG. 7

| APPLICATION NAME | OPERATION IN LIMITED SHEET NO. |
|---|---|
| APPLICATION 1 | CONTINUATION OK |
| APPLICATION 2 | CONTINUATION NG |
| APPLICATION 3 | CONTINUATION OK |

FIG. 8

| APPLICATION NAME | USE CONDITION |
|---|---|
| APPLICATION 1 | 100 YEN/TIME |
| APPLICATION 2 | 0 YEN |
| APPLICATION 3 | 1,000 YEN/MONTH |

FIG. 9

| APPLICATION NAME | PERFORMING JOB SETTINGS | | |
|---|---|---|---|
| | COLOR SETTINGS | DOUBLE-SIDE SETTINGS | INTENSIVE SETTING |
| APPLICATION 1 | B/W | DOUBLE-SIDE | 2-Up OR UP |
| APPLICATION 2 | — | — | — |
| APPLICATION 3 | — | DOUBLE-SIDE | 4-Up OR UP |

FIG. 10

| VALID DOMAIN NAME |
|---|
| DOMAIN A.jp |
| DOMAIN B.jp |
| DOMAIN E.jp |

| APPLICATION NAME | ADDED NO. OF SHEETS |
|---|---|
| APPLICATION 1 | PERFORMED NO. OF SHEETS |
| APPLICATION 2 | 0 SHEETS |
| APPLICATION 3 | n SHEETS |

IMAGE FORMING APPARATUS AND SYSTEM CONNECTABLE WITH AN AUTHORIZATION APPARATUS VIA A COMMUNICATIONS NETWORK, THE IMAGE FORMING APPARATUS COMPRISING AN APPARATUS CONTROL SECTION, AN INITIAL INQUIRY SECTION, A CHANGE DETECTION SECTION, AND A RE-INQUIRY SECTION

This Nonprovisional application claims priority under 35 U.S.C. §119(a) on Patent Application No. 2010-276043 filed in Japan on Dec. 10, 2010 and on Patent Application No. 2011-258317 filed in Japan on Nov. 25, 2011, the entire contents of which are hereby incorporated by reference.

TECHNICAL FIELD

The present invention relates to an image forming apparatus, an authorization apparatus, and an image forming system, each of which is capable of providing limits to a number of usable recording sheets.

BACKGROUND ART

A system is available in which an application operating on a PC (personal computer) works in cooperation with functions of an image forming apparatus, where the image forming apparatus operates as a part of a total application system. Use of this system allows for centrally managing accounting functions such as authorization and counting, and usable amount limits of a user, in a server.

Patent Literature 1 discloses a technique as described below. A user is asked to enter (i) a function (service) such as color or black-and-white and (ii) a number of sheets to be used corresponding to the service. These entered (i) and (ii) are transmitted from the image forming apparatus to a usable amount limiting apparatus. If the number of sheets to be used is within a usable number of sheets corresponding to the service, and the usable amount limiting apparatus allows its use, the image forming apparatus can perform a job (printing and/or copying) within a range of the entered number of sheets to be used.

Patent Literature 2 discloses a technique in which printing data is analyzed by a printer control apparatus before the printing data is transmitted to an image forming apparatus, in order to present a user an accurate cost. According to this technique, the printing process is started after each page is distinguished in its color (color or black and white) and its printing cost is calculated.

Moreover, conventionally, many convenience stores provide a copying machine in their store front, so that a user who visits the convenience store can readily carry out a copying process. Such a copying machine usually has a fee management apparatus for charging the user a fee in exchange of the copying process. The user inserts money into the fee managing apparatus prior to carrying out the copying process, to be able to perform the copying process within a range in which the money is inserted. When the amount to which the copying process is performed exceeds the amount possible according to the money inserted by the user, the copying process automatically stops.

CITATION DOCUMENTS

Patent Literature

Patent Literature 1
Japanese Patent Application Publication, Tokukai, No. 2008-186101 A (Publication Date: Aug. 14, 2008)

Patent Literature 2
Japanese Patent Application Publication, Tokukai, No. 2006-88382 A (Publication Date: Apr. 6, 2006)

SUMMARY OF INVENTION

Technical Problem

Including a case of performing a copying process with a copying machine provided in a store, there has been an increase in ways of using image forming apparatuses these days where a limit is provided to the number of recording sheets a user can use for copying and printing with use of an image forming apparatus, based on some kind of condition. With this way of use, the user is allowed to use the image forming apparatus as long as it is within that limit.

In such a case, the configuration as in Patent Literature 1 unavoidably causes the decrease in performance of the image forming apparatus. This is because, in order to have a use amount limiting apparatus determine whether or not to perform the job, a user requires entering the function (service) such as color or black and white and a planned number of sheets to be used, at the time of authorization. This configuration requires more time to start the process caused by the need for the user to enter such operation.

The same applies to the case of Patent Literature 2. The start of the process is delayed by the amount of time required for analyzing the printing data. This unavoidably causes the decrease in performance of the image forming apparatus. The same also applies to a case where this technique is used for copying, where a scanned data scanned by the image forming apparatus is transmitted to a printer control apparatus for analysis.

Processing speed of the image forming apparatus is increasing more and more these days, and models having extremely high performance are becoming available on the market. However, not the best have been brought out from these models, due to the time required for calculating a usable amount of sheets, which causes the start of the image forming operation to be delayed.

In a process of limiting the number of sheets in a system capable of centrally managing accounting functions such as authorization and counting and further limits of a usable amount of a user in a server, the server or a PC performs an approval process and designates the number of usable sheets immediately before the job starts to be performed, such as how many color sheets or how many black and white sheets can be processed. Meanwhile, the image forming apparatus causes the job to stop when the number of sheets meets the designated limited number.

For example, if a user inserts 100 yen into a fee management apparatus with a unit price setting of 50 yen per color copy and 10 yen per black and white copy, an account application of the system can only designate either of "2 sheets of color copies" or "10 sheets of black and white copies". Hence, in order to handle both processes of the color copies and black and white copies within the inserted amount, the image forming apparatus requires to have a configuration which makes an inquiry to the application for each 1 page (1 sheet) of the image forming process (job performing), before starting the process to that page, of whether or not the process can be performed (whether or not the limited number of sheets is exceeded), and thereafter perform the process upon receiving authorization as the process being performable.

With such a configuration, there is no need to have a user enter a planned number of sheets to be printed or have the printer control apparatus analyze the color/black and white of all pages as like in Patent Literatures 1 and 2. Accordingly, this allows for a prompt start of the process.

However, in order to carry out image forming processes for 50 sheets, this would require making an inquiry 50 times, and the more the number of sheets which require processing, the more the number of inquiries. Hence, if the number of sheets to be processed increases, the time required for the inquiring builds up, which unavoidably causes a decrease in the performance of the image forming apparatus.

The present invention is accomplished in view of the foregoing problem, and is related to an image forming apparatus, an authorization server, and an image forming system, each of which allows for efficiently reducing the number of inquiries made in a mechanism of inquiring whether or not a limited number of sheets is exceeded, to perform a process within the limited number of sheets in a system capable of centrally managing, in a server, accounting functions such as authorization and counting and a use amount limit of a user.

In order to attain the object, an image forming apparatus of the present invention is an image forming apparatus connectable with an authorization apparatus via a communications network, the image forming apparatus including: an apparatus control section configured to control an image forming section based on a processable number of sheets that an image forming process can be performed, to limit execution of an image forming job, the processable number of sheets being set by the authorization apparatus; an initial inquiry section configured to transmit, in executing the job, initial condition information related to a process to be performed to a first page of the job, to inquire the processable number of sheets in a case where the process is performed based on the initial condition information; a change detection section configured to detect a change in condition information while the job is being executed; and a re-inquiry section configured to transmit, to the authorization apparatus, (i) a changed condition information and (ii) information of the number of sheets being processed based on a current condition information prior to the change in condition information, each time the change in condition information is detected by the change detection section, to inquire a processable number of sheets in a case where the process is performed based on the changed condition information, the apparatus control section starting execution of the job upon obtaining the processable number of sheets as a result of inquiring with the initial inquiry section, and in a case where, while the job is executed, a processed number of sheets meets the processable number of sheets that is approved for performing the process based on the current condition information, the apparatus control section forbidding the image forming apparatus to perform the process to a new recording sheet and stopping the job.

The condition information in the specification is, for example, setting conditions that the authorization apparatus requires for calculating a processable number of sheets out of setting conditions set to perform an image forming job such as color settings, sheet size, sheet type, and double-side settings.

According to the configuration, an initial inquiry section makes an inquiry for a processable number of pages based on the condition information of a $1^{st}$ page, and after the processable number of pages is obtained, no inquiry for the processable number of sheets is made to the authorization apparatus until a change in the condition information is detected by the change detection section.

The change detection section detects a change in the condition information. As a change in the condition information is detected by the change detection section, the re-inquiry section transmits to the authorization apparatus a changed condition information and information of the number of processing sheets processed based on the condition information prior to the change, to make an inquiry for a processable number of sheets in a case where a process is performed based on the changed condition information.

Upon receiving the processable number of sheets as a result of inquiring by the initial inquiry section, the apparatus control section causes the job to start. While the job is in process, in a case where a processed number of sheets meets the processable number of sheets approved for the process performed based on the condition information, the apparatus control section forbids the processing to a new recording sheet, and causes the job to stop.

As such, according to the configuration, the number of inquiries made to obtain a processable number of sheets to the authorization apparatus can be reduced to just the initial inquiry and whenever there is a change in the condition information. This allows for performing the image forming processes while preventing a decrease in the performance of the image forming apparatus to the least possible.

Effect of Invention

The present invention brings about an effect that the number of inquiries made can be efficiently reduced in number, in a mechanism in which inquiries are made as to whether or not the limited number of sheets is exceeded to perform the process within a limited number of sheets, in a system capable of centrally managing, in a server, accounting functions such as authorization and counting, and use limits of a user.

BRIEF DESCRIPTION OF DRAWINGS

FIG. 6 is a block diagram schematically illustrating an image forming system according to another embodiment of the present invention.

FIG. 7 is a view illustrating an example (No. 1) of information related to an application, which information is used in the image forming system according to another embodiment of the present invention.

FIG. 8 is a view illustrating an example (No. 2) of information related to an application, which information is used in the image forming system according to another embodiment of the present invention.

FIG. 9 is a view illustrating an example (No. 3) of information related to an application, which information is used in the image forming system according to another embodiment of the present invention.

FIG. 10 is a view illustrating an example (No. 4) of information related to an application, which information is used in the image forming system according to another embodiment of the present invention.

DESCRIPTION OF EMBODIMENTS

Embodiment 1

One embodiment of the present invention is described below with reference to FIGS. 1 to 5. The present embodiment exemplifies an image forming system in which an authorization server limits processes to be performed by a multifunction peripheral provided in store fronts such as a convenience store or the like, so that the processes are to be performed within a range of the amount of money inserted by a user.

Figure 1:
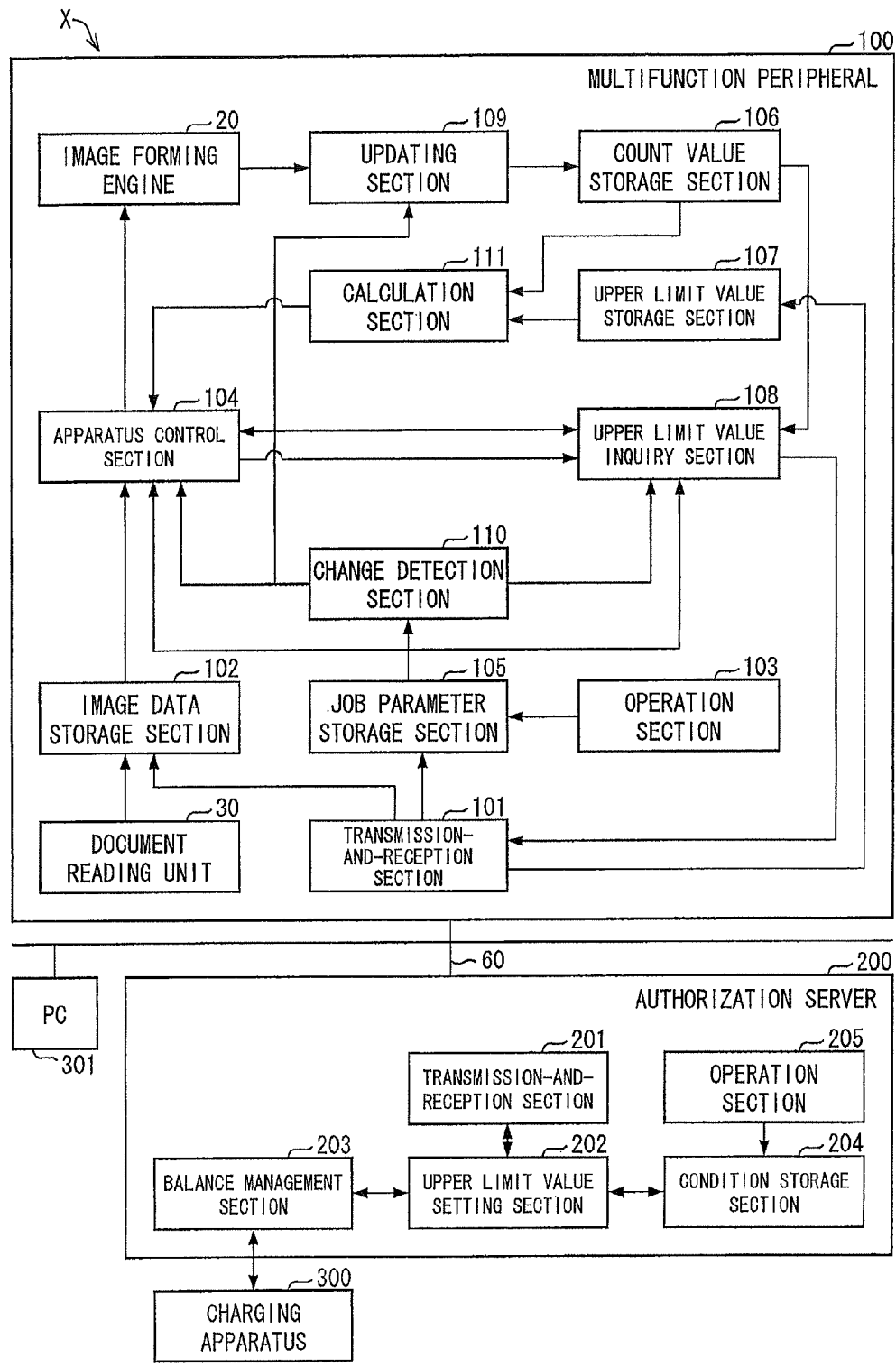
FIG. 1 is a block diagram schematically illustrating a configuration of an image forming system according to an embodiment of the present invention.

FIG. 1 is a block diagram schematically illustrating a configuration of an image forming system X according to the present embodiment. In the image forming system X, a multifunction peripheral (image forming apparatus) 100, an authorization server (authorization apparatus) 200, and an information processing apparatus (PC) 301 are connected to each other via a communications network 60 such as the Internet or Intranet.

The multifunction peripheral 100 performs (i) a copying process which obtains an image by reading a document with the document reading unit 30 and then forms the image on a recording sheet by an image forming engine 20, and (ii) a printing process which forms an image corresponding to printing data transmitted from the information processing apparatus 301 onto a recording sheet. Hereinafter, whenever there is no need to particularly distinguish the copying process and the printing process, the two are collectively called an image forming process.

In performing the image forming process, the multifunction peripheral 100 can make an inquiry to the authorization server 200 of the processable number of sheets, to limit a use of a user within a usable range. More specifically, the multifunction peripheral 100 permits just the image forming onto a recording sheet for the number of sheets that the user has paid for.

The authorization server 200 is constructed by having a CPU of an information processing apparatus or a server to execute an account application stored in a RAM or the like, and the authorization server 200 is connected with a charging apparatus 300 such as a coin vender or the like. The authorization server 200 calculates, based on the amount of money inserted into the charging apparatus 300, a processable number of sheets for performing an image forming process such as the copying process and printing process, and notifies this to the multifunction peripheral 100. The multifunction peripheral 100 performs the image forming process within the range of the processable number of sheets approved by the authorization server 200.

In FIG. 1, the charging apparatus 300 is connected locally with the authorization server 200. Alternatively, the charging apparatus 300 may be connected with the authorization server 200 on the communications network 60. Moreover, the charging apparatus 300 may be configured locally connected to the multifunction peripheral 100, and information of the inserted amount of money is transmitted from a transmission-and-reception section 101 of the multifunction peripheral 100.

The information processing apparatus 301 utilizes a printing function of the multifunction peripheral 100, and may be an information processing apparatus such as a PC/AT-Compatibles or a MAC standard apparatus, or a terminal such as a portable terminal for example a PDA. There also may be a plurality of information processing apparatuses 301 which have similar configurations and which are connected to the communications network 60.

The communications network 60 is an IP network or the like such as the Intranet/Internet, for example LAN, wireless LAN, WiMAX, PLC, c.link, and the like, and may also connect with an external network. Moreover, the communications network 60 may also be a telephone line or a serial cable.

Figure 2:
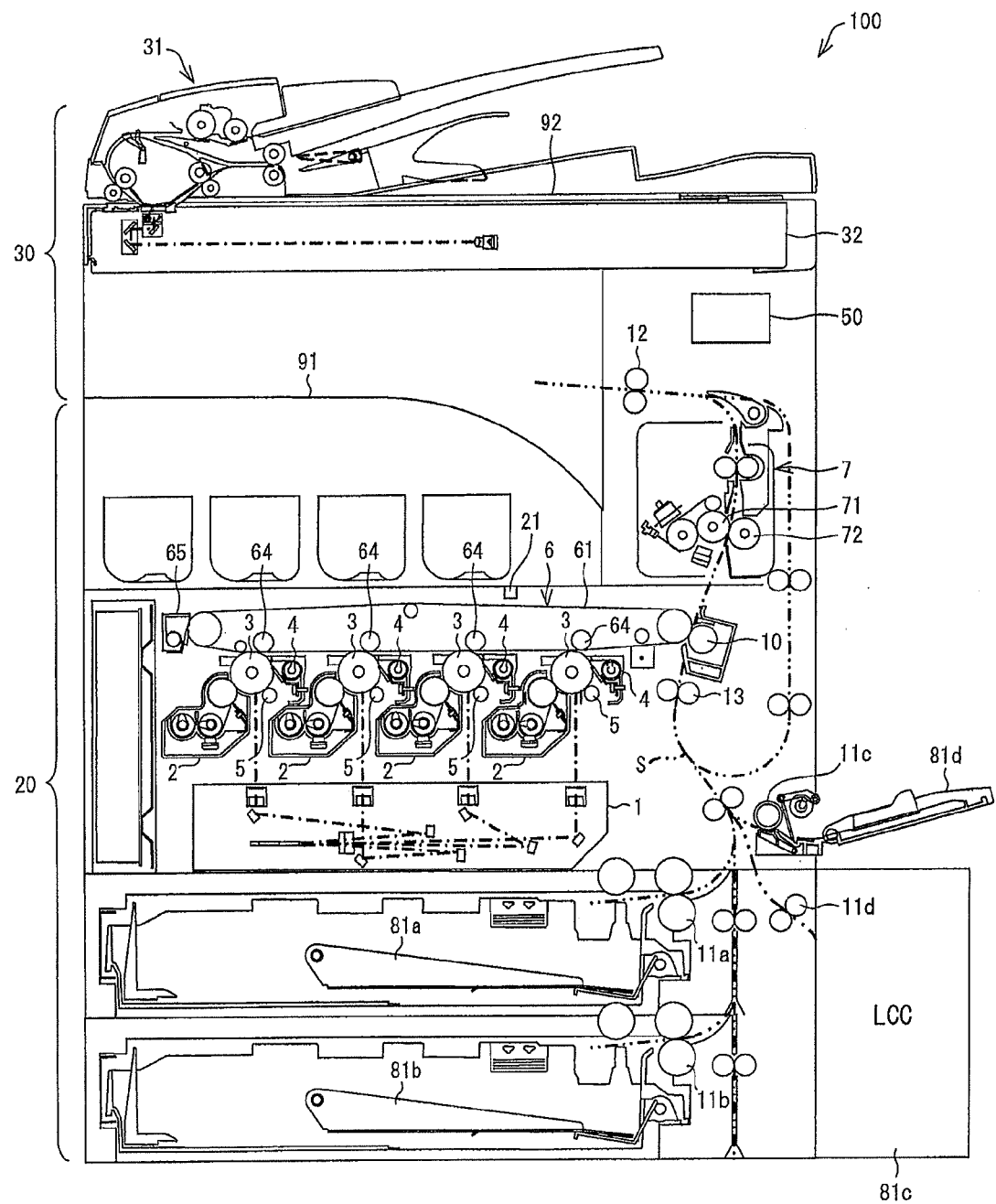
FIG. 2 is a longitudinal sectional view schematically illustrating a multifunction peripheral which is included in an image forming system.

First described is a configuration of the multifunction peripheral 100, with reference to FIG. 2. FIG. 2 is a longitudinal sectional view schematically illustrating a configuration of the multifunction peripheral. The multifunction peripheral 100 performs a copying process, a document reading process, a facsimile process, and a printing process, and includes a document reading unit (document reading section) 30, an image forming engine (image forming section) 20, and a control section 50 controlling the document reading unit 30 and the image forming engine 20.

The image forming engine 20 of the multifunction peripheral 100 includes, for example an exposure unit 1, a developer 2, a photoreceptor drum 3, a photoreceptor cleaner unit 4, an electrifier 5, an intermediate transfer belt unit 6, a transfer unit 10, a fixing unit 7, a paper feeding cassette 81, and a paper output tray 91, as illustrated in FIG. 2.

Image data that is processed by the multifunction peripheral 100 is image data which corresponds to color images using each of colors black (K), cyan (C), magenta (M), and yellow (Y). Hence, four each of the developer 2, the photoreceptor drum 3, the electrifier 5, and the photoreceptor cleaner unit 4 are provided so that four types of latent images are formed in accordance with each color, and further the multifunction peripheral 100 includes four image forming stations: black, cyan, magenta, and yellow.

The electrifier 5 is charging means for evenly charging, to a predetermined electric potential, the surface of the photoreceptor drum 3 disposed in a same image forming station. A charger type electrifier such as scorotron may be used as the electrifier 5, or a touch roller type or brush type may be used as the electrifier 5.

The exposure unit 1 exposes each of the photoreceptor drums 3 with light in accordance with the image data of the document, which photoreceptors are evenly charged by the electrifier 5 of the respective image forming station, to form an electrostatic latent image corresponding to the image data on the surface of the photoreceptor drum 3. As the exposure unit 1, a laser scanning unit (LSU) including a laser irradiation section and a reflection mirror may be used, or a writing head in which light-emitting elements (e.g. EL or LED) aligned in an array-shape may be used. Note that the multifunction peripheral 100 of the present embodiment employs a double-beam method which reduces the speeding up of the irradiation timing by use of a plurality of laser beams.

The developer 2 visualizes the electrostatic latent image formed on the photoreceptor drum 3 disposed in the same image forming station, with toner contained in the developer 2 (which contains toner of one of colors YMCK), to form a toner image.

Moreover, the photoreceptor cleaner unit 4 removes and collects the toner remaining on the surface of the photoreceptor 3 disposed in the same image forming station, after the toner is transferred.

The intermediate transfer belt unit 6 causes the toner image formed on the surface of the photoreceptor drum 3 in each of the image forming stations, to be transferred onto a recording sheet on a surface of a rotating intermediate transfer belt 61, so that the toner images are superposed.

On an inner side of the intermediate transfer belt 61, four intermediate transfer rollers 64 are disposed so as to face the photoreceptor drums 3 of the image forming stations, respectively, in such a manner that the intermediate transfer belt 61 is sandwiched between the intermediate transfer rollers 64 and the photoreceptor drums 3. To each of the intermediate transfer rollers 64, a transferring voltage for transferring the toner image on the photoreceptor drum 3 to the intermediate transfer belt 61 is applied.

Moreover, the intermediate transfer belt unit 6 further includes a belt cleaning unit 65 which removes and collects the toner remaining on the surface of the intermediate transfer belt 61 after the toner image is transferred onto the recording sheet.

The paper feeding tray 81 is a tray for accumulating the recording sheets to be used for the image forming. In the present embodiment, a plurality of paper feeding trays 81*a* and 81*b* are disposed for carrying out a high-speed printing process to a large amount of sheets, and in each tray, around 500 to 1500 standard-sized sheets are stored. In addition to the paper feeding trays 81*a* and 81*b*, a paper feeding tray 81*c* including manual feeding trays used when mainly printing sheets of nonstandard size sheets and a paper feeding tray 81*d* made up of a large-capacity paper feeding cassette capable of storing a plurality of sheet types in large amounts are provided on a side part of the multifunction peripheral 100. The recording sheets stacked on the paper feeding trays 81*a* to 81*d* are fed by respective paper feeding rollers 11*a* to 11*d*, and thereafter are conveyed to a transfer nip part which is an abutting part of the transfer conveying belt 61 and the transfer unit 10.

The paper output tray 91 is a tray for receiving the recording sheets on which an image is formed. The recording sheets discharged by the paper output roller 12 from inside the multifunction peripheral 100 are placed on the paper output tray 91. The multifunction peripheral 100 of the present embodiment may also optionally have, instead of the paper output tray 91, a post processing apparatus for carrying out stapling, punching, and like processes to the sheet on which the image is formed, and/or a paper output tray having a plurality of trays.

Moreover, the image forming engine 20 includes a recording paper conveying path S running substantially perpendicularly, for conveying the recording sheet fed from the paper feeding trays 81*a* to 81*d* to the paper output tray 91, which passes through the transfer unit 10 and the fixing unit 7. In the vicinity of the recording paper conveying path S to the paper feeding trays 81*a* to 81*d*, members such as the paper feeding rollers 11*a* to 1*d*, a plurality of conveying rollers, the registration roller 13, the transfer unit 10, the fixing unit 7, the paper output roller 12, and the like are disposed.

The conveying roller is a small-sized roller for accelerating and assisting conveyance of the recording sheet, and a plurality thereof are provided along the recording paper conveying path S. Moreover, the paper feeding rollers 11*a* to 11*d* feeds the recording sheets picked up one by one from the paper feeding trays 81*a* to 81*d* to the recording paper conveying path S.

The registration roller 13 temporarily holds the recording sheet conveyed along the recording paper conveying path S. At a timing at which a tip of a toner image transferred onto the intermediate transfer belt 61 and a predetermined position of the recording sheet run into each other, the registration roller 13 conveys the recording sheet to the transfer unit 10. The transfer unit 10 is applied with a transfer voltage for transferring the toner image on the intermediate transfer belt 61 onto the recording sheet.

The fixing unit 7 fixes the toner image on the recording sheet by melting the toner image transferred onto the recording sheet by the intermediate transfer belt unit 6 and applying pressure on the recording sheet. The fixing unit 7 includes a fixing roller 71 and a pressure roller 72. The fixing roller 71 has on its outer circumference, a sheet releasing claw, a roller surface temperature detecting member (thermistor), a cleaning unit for cleaning the roller surface, and the like.

Furthermore, a heat source such as a halogen lamp is disposed inside the fixing roller 71, for heating the surface of the fixing roller to a predetermined temperature (to around 160° C. to 200° C.). Meanwhile, the pressure roller 72 has a pressure member so that the pressure roller 72 can apply a predetermined pressure on the fixing roller 71 on both ends of the fixing roller 71. The pressure roller 72 has on its outer circumference a sheet releasing claw, a cleaning unit and like members, similarly to the outer circumference of the fixing roller 71. The fixing unit 7 fixes the toner image onto the sheet by melting the unfixed toner on the recording sheet with use of the surface temperature of the fixing roller 71 and applying pressure on the toner with the two rollers 71 and 72, at a pressured area (fixing nip) of the fixing roller 71 and the pressure roller 72.

The document reading unit 30 mainly has an automatic document feeding device 31 and a scanning section 32. The plurality of document sheets placed on the mounting tray of the automatic document feeding device 31 are successively fed to an upper part of the scanning section 32, so that the document is read.

Moreover, the multifunction peripheral 100 includes an operation section 103 not illustrated in FIG. 2 (see FIG. 1). The user can operate the multifunction peripheral 100 via the operation section 103. For example, the user can instruct to start a copying process to the multifunction peripheral 100 through the operation section 103.

The control section 50 controls operations of sections of the aforementioned image forming engine 20 and document reading unit 30, and performs image processing of image data. The control section 50 is a microcomputer at least including a CPU and a RAM or a ROM, and the control section 50 functions by reading in a program stored in the ROM or RAM and by using the RAM as a workspace.

Moreover, as described above, with the multifunction peripheral 100, the use by the user can be limited to be within a usable range. Such a use limit is performed by the control section 50.

The following description explains an image forming step performed by the multifunction peripheral 100. The description here explains a copying process. When the operation section 103 receives from the user an execution of a copying process, the document sheet is read one sheet at a time by the document reading unit 30, to create image data. Thereafter, recording sheets in accordance with a size of the image data of the document is fed from one of the paper feeding trays 81a to 81d, and is conveyed to the registration roller 13 by the conveying rollers.

The recording sheet that has been conveyed to the registration roller 13 once stops, and is conveyed again at a timing at which the tip of the recording sheet and the tip of the toner image on the intermediate transfer belt 61 run into each other. The recording sheet again conveyed has the toner image be transferred thereon at the transfer nip part described above, and thereafter, the toner image is fixed by the fixing unit 7 and is outputted from the paper output tray 91.

If the multifunction peripheral 100 has a plurality of modes (e.g. copying mode, printer mode, FAX mode) or is capable of performing a plurality of printing processing methods (e.g. one-side (single-side) printing or double-side printing), the conveying path from the fixing unit 7 to the paper output tray 91 changes depending on the mode or the printing processing method.

This is because, generally, in the copying mode, the user operates the apparatus in the vicinity of the apparatus, so therefore "face-up discharge" is often used, which discharges a printed document with its printed side face up. On the other hand, with the printer and FAX modes, the user is usually not in the vicinity of the apparatus. Hence, "face-down discharge" is used, which outputs the discharged sheets in its proper page order. Accordingly, the multifunction peripheral 100 has a plurality of conveying paths and a plurality of branching claws between the fixing unit 7 to the paper output tray 91 through which the sheet can be passed, and the conveying path is selected depending on the purpose of the sheet.

Moreover, the multifunction peripheral 100 carries out multiprocessing to increase the number of recording sheets an image is formable per unit time.

The following description explains the multiprocessing. As described above, the image forming process usually includes, largely classified, a paper feeding process to obtain a recording sheet from a paper feeding tray, a transfer process to transfer the toner image formed on the photoreceptor drum onto the recording sheet, a fixing process to fix the toner image transferred on the recording sheet with heat and pressure, and a paper discharge process to discharge the recording sheet on which the toner image is fixed to the paper output tray. Each of these processes is carried out separately.

In the multiprocessing, while one of the foregoing processes is carried out to a recording sheet, a different process is carried out to a different recording sheet. Table 1 shows an example of the multiprocessing.

TABLE 1

| | | Paper feeding process | Transfer process | Fixing process | Paper discharge process |
|---|---|---|---|---|---|
| Recording sheet | $1^{st}$ sheet | — | — | — | In process |
| | $2^{nd}$ sheet | — | — | In process | — |
| | $3^{rd}$ sheet | — | In process | — | — |
| | $4^{th}$ sheet | In process | — | — | — |

As shown in Table 1, simultaneously with performing the paper discharge process to the $1^{st}$ recording sheet which discharges the first recording sheet to the paper output tray 91 by the paper output roller 12, the fixing process is performed to the $2^{nd}$ recording sheet by the fixing unit 7. Moreover, the transfer process is performed to the $3^{rd}$ recording sheet by the transfer unit 10, and furthermore the paper feeding process is performed to the $4^{th}$ recording sheet, which paper feeding process feeds a sheet from one of the paper feeding units 81a to 81d with the respective paper feeding rollers 11a to 11d.

The multifunction peripheral 100 increases in processing speed by simultaneously carrying out different processes to a plurality of recording sheets. It is general that such a multi-processing is carried out in image forming apparatuses which have high-speed output functions. By carrying out the multi-processing, a high-speed image forming apparatus becomes capable of outputting with a velocity of 100 PPM or more. The unit PPM is the number of processed sheets in 1 minute.

The following description explains functions of each of the multifunction peripheral 100 and the authorization server 200, referring back to FIG. 1. The multifunction peripheral 100 is described first.

As illustrated in FIG. 1, the multifunction peripheral 100 includes, in addition to the image forming engine 20 and the document reading unit 30, a transmission-and-reception section 101, an operation section 103, a job parameter storage section 105, an image data storage section 102, an apparatus control section 104, a change detection section 110, an upper limit value storage section 107, a count value storage section 106, a calculation section 111, an updating section 109, and an upper limit value inquiry section (initial inquiry section, re-inquiry section) 108.

From among these sections, the apparatus control section 104, the calculation section 111, the updating section 109, the change detection section 110, and the upper limit value inquiry section 108 are implemented by having the CPU of the control section 50 execute a program loaded on the RAM.

The operation section 103 is made up by a user interface such as a touch panel or the like, which receives an entry from the user and also notifies various information to the user. The information that the operation section 103 receives from the user includes (1) information and job execution orders which designates a type of job such as a copying process, a FAX transmission process or the like, (2) specific setting information indicative of a specific image forming method at a time when the copying process or the FAX transmission process is to be performed (number of outputted copies, sheet type, sheet size, media amount, output density, stapling request, hole-punching request, page collation request, color/black-and-white, color attribute, color depth, double-side printing/one-side (single-side) printing, layout format, sheet tray selection, scanning destination, printing destination, etc.).

From among the information received by the operation section 103, specific setting information of the job is stored in the job parameter storage section 105. The job parameter storage section 105 is a memory which stores the specific setting information.

The transmission-and-reception section 101 is configured of for example a network interface card, and receives printing job data from an external communication terminal, in performing a printing process.

The printing job data received by the transmission-and-reception section 101 includes image data and the specific setting information described above. From among the printing job data received by the transmission-and-reception section 101, the image data is stored in the image data storage section 102, and the specific setting information is stored in the job parameter storage section 105.

The image data storage section 102 is a memory which stores the image data to which the image forming process is performed. When performing the copying process, image data of a document created by the foregoing document reading unit 30 by reading the document sheet is successively stored in the image data storage section 102.

Moreover, the transmission-and-reception section 101 transmits to the authorization server 200 inquiry information in accordance with an instruction from the upper limit value inquiry section 108 later described, and receives information of the processable number of sheets transmitted from the authorization server 200 as a response to this inquiry. The received processable number of sheets is stored in the upper limit value storage section 107.

The upper limit value storage section 107 stores the processable number of sheets transmitted from the authorization server 200 as an upper limit value. The multifunction peripheral 100 performs the image forming process so that the upper limit value stored in the upper limit value storage section 107 is not exceeded in amount.

In performing the job (image forming job) of the image forming process, the upper limit value inquiry section 108 transmits to the authorization server 200 inquiry information making an inquiry of a processable number of sheets by the image forming engine 20, to obtain the processable number of sheets (initial inquiry). The inquiry information transmitted by the upper limit value inquiry section 108 at the time of starting the job includes condition information of the image forming process for the first page. The upper limit value inquiry section 108 obtains the condition information for the first page by referring to the specific setting information transmitted from the job parameter storage section 105 to the apparatus control section 104. The authorization server 200 transmits the processable number of sheets based on the condition information.

The following describes the condition information. The condition information is setting conditions required for the authorization server 200 to calculate the processable number of sheets, from among various setting conditions related to processes set for the image forming job, such as color settings, sheet size, sheet type, double-side setting and the like.

For example, a unit price of the image forming process (price per sheet) is often set with different unit prices based on color/black-and-white settings, size of the recording sheet, and the like. For example, with a sheet size of A3 and a black and white setting as the color/black-and-white setting, the price is 30 yen per sheet, and with a sheet size of any size other than A3 and being a black and white copy, the price is 10 yen per sheet. Alternatively, the unit price may be set such as a color sheet is 50 yen per sheet and a black and white sheet is 10 yen per sheet regardless of the sheet size. Moreover, the unit price may be set even more minutely in addition to the sheet size and color/black-and-white settings, such as the sheet type and whether or not post processes such as stapling, punching holes are to be performed.

Moreover, colors in the color/black-and-white settings may be even further fractionized into color attributes. There are three types of color attributes: "full color" which uses all color toners; "selected colors" which uses a plurality of colors among the color toners; and "single color" which uses one color from among the color toners. Out of these three types, "full color" is set with the most expensive unit price, and "single color" is set with the cheapest unit price. Moreover, the unit price may differ depending on color depth of the specific setting information. The color depth indicates an information amount in a color image, and is synonymous with resolution. The higher the color depth, the larger the data size and the more expensive the unit price. Moreover, a color amount may be used as a parameter which affects the unit price. The color amount indicates the consumed amount of color material; of course, as the color amount increases, the unit price increases.

Furthermore, the black and white setting may be even further fractionized into black and white attributes. There are two types of black and white attributes: "gray scale" using two colors of the color toners; and "mono 2 value" just using the black toner. The gray scale is more expensive. Moreover, a gradient attribute may be included as a parameter which affects the unit price. The gradient attribute indicates a gradient of each dot, and the higher the gradient the clearer the image. However, since the data size increases proportionally to the increase of the gradient, the unit price becomes expensive.

The setting condition (condition information) required for the authorization server 200 to calculate the processable number of sheets depends on an environment in which the image forming apparatus is provided. Hence, it is preferable that the condition information can be set freely from the authorization server 200, or alternatively, with use of the operation section 103 of the multifunction peripheral 100.

However, for easy explanation, the image forming system X of the present embodiment illustrates a case where just the color/black-and-white settings of the setting conditions serves as the condition information.

While the job is in process, the change detection section 110 refers to the specific setting information transmitted to the apparatus control section 104 from the job parameter storage section 105, and detects a change in the condition information if there is a change in the condition information of the next page to be processed. The change detection section 110, upon detecting that the condition information changes for a page to be processed, notifies the upper limit value inquiry section 108, the apparatus control section 104, and the updating section 109 that there is a change in the condition information.

When the upper limit value inquiry section 108 receives the notification from the change detection section 110 that the condition information is to change, inquiry information to make an inquiry of a processable number of sheets is again transmitted to the authorization server 200, to again obtain a new processable number of sheets (re-inquiry).

The inquiry information transmitted by the upper limit value inquiry section 108 as a result of detecting the change in the condition information includes (i) the changed condition information and (ii) processing result information of the job processed based on the condition information prior to the change. The upper limit value inquiry section 108 uses the number of processed sheets counted by the count value storage section 106 (later described) as a result processed based on the condition information prior to the change.

The processing result information of the job processed based on the condition information prior to the change is transmitted together with the changed condition information, to allow for calculating the processable number of sheets in the authorization server 200 upon consideration of the result processed based on the condition information prior to the change. Accordingly, the information of the processable number of sheets based on the changed condition information transmitted from the authorization server 200 is of an accurate value calculated in view of the result processed based on the condition information prior to the change in the multifunction peripheral 100.

As the processing result information of the job processed based on the condition information prior to the change, (i) a count value which is the number of processed sheets and (ii) condition information of the count value are transmitted to the authorization server 200. Alternatively, if the authorization server 200 has a configuration which can store the condition information of a time when the processable number of sheets was calculated previously (may be initially), just the count value is transmitted.

The upper limit value inquiry section 108 makes an inquiry to the authorization server 200 every time the change detection section 110 detects a change in the condition information for a subsequently processed page, and obtains the number of sheets processable based on the changed condition information. Thereafter, the value of the upper limit value storage section 107 is rewritten every time the condition information is changed and a new processable number of sheets is obtained.

The apparatus control section 104, by controlling each of the sections of the image forming engine 20, forms on a recording sheet an image corresponding to the image data received from the image data storage section 102, in accordance with the specific setting information stored in the job parameter storage section 105.

The apparatus control section 104 receives, from the image data storage section 102, (i) image data of a document which is created by reading a document sheet with the document reading unit 30 in the case of the copying process, and (ii) image data among the printing job data received by the transmission-and-reception section 101 in the case of the printing process. Thereafter, the apparatus control section 104 controls the sections of the image forming engine 20 described above based on the received image data and the specific setting information stored in the job parameter storage section 105, to cause the image forming engine 20 to form a desired image (image corresponding to the printing data received from an external communication terminal or an image corresponding to a document image drawn on a document sheet) on the recording sheet (a specific forming method of the image is in accordance with the specific setting information).

When the upper limit value inquiry section 108 obtains a processable number of sheets as a result of the initial inquiry, the apparatus control section 104 starts the execution of the job. Thereafter, when a change of the condition information is detected by the change detection section 110, processing to a new recording sheet is forbidden. After a new processable number of sheets is obtained as a result of making an inquiry by the upper limit value inquiry section 108, the forbidden state of the processing to a new recording sheet is released, which resumes the process. Furthermore, when the number of sheets processed after obtaining the processable number of sheets in a latest inquiry meets the processable number of sheets obtained in the latest inquiry, the apparatus control section 104 forbids the processing to a new recording sheet and stops the job.

The apparatus control section 104 is configured to receive an entry of a difference between (a) an upper limit value (value stored in the upper limit value storage section 107) which is the processable number of sheets and (b) the number of processed sheets actually processed after the image forming engine 20 obtains the upper limit value. The apparatus control section 104 is to perform the process in a case where the entered difference is 1 or more. This is described in detail later.

The count value storage section 106 stores a processed number of sheets (count value) that the image forming engine 20 has performed the image forming process to in the job. The processed number of sheets is reset to 0 (zero) once the condition information is changed. Hence, the processed number of sheets is calculated for each condition information. The count value of the count value storage section 106 prior to the start of the job is set as 0.

The updating section 109 adds to the count value of the count value storage section 106 by 1, every time the image forming engine 20 performs the image forming process to one recording sheet. When a change is detected by the change detection section 110, the updating section 109 resets the count value of the count value storage section 106 to 0. This makes it possible to calculate the processed number of sheets for each condition information.

The calculation section 111 obtains an upper limit value from the upper limit value storage section 107, obtains a count value (processed number of sheets) from the count value storage section 106, and takes away the count value from the upper limit value to calculate the difference between the upper limit value and the count value. The value of the calculated difference is transmitted to the apparatus control section 104.

The apparatus control section 104 determines whether or not to perform the image forming process with the image forming engine 20, based on the value of the difference received from the calculation section 111. As described above, the apparatus control section 104 controls the image forming engine 20 so that image forming is performed to a new recording sheet in the case where the difference value is not less than 1, whereas if the difference value is 0, the apparatus control section 104 forbids the image forming engine 20 from starting an image forming on a new recording sheet.

Namely, the apparatus control section 104 controls the image forming engine 20 so that image forming is not started to a new recording sheet if the difference is 0 (if the count value meets the upper limit value), based on the difference value calculated by the calculation section 111, which difference value decreases in value as the image forming engine 20 performs the image forming.

By having the apparatus control section 104 control the image forming engine 20 as such, it is possible to prevent the image forming engine 20 from performing excess image forming to recording sheets (wasted recording sheets) which exceed the processable number of sheets, even in the case where the image forming is carried out by the multiprocessing described above.

The following description explains this more specifically. In the multiprocessing, each of the paper feeding process, the transfer process, the fixing process, and the paper discharge process are carried out simultaneously, as described above. Hence, if the number of sheets that is processed by the image forming engine 20 is counted at a time of completing the paper discharge process, the other various processes would have already been performed to the following recording sheets at that time. As a result, even if the image forming to a new recording sheet is forbidden immediately after detecting that the upper limit value is met at that point in time, this would be too late and the image forming to these following recording sheets would be of a waste. For instance, in the example shown in Table 1 earlier, image forming is excessively performed to at least three recording sheets.

On the other hand, as described above, if the apparatus control section 104 controls the image forming engine 20 so that the image forming of a new recording sheet is started when the difference between the count value and the upper limit value is not less than 1 and no image forming is to be started if the difference is 0, it is possible to positively prevent the performing of excess image forming to a recording sheet which exceeds the processable number of sheets.

Moreover, with this configuration, except for the cases where the processed number of sheets (count value) meets the upper limit value or where a change occurs to the condition information, the number of recording sheets to which the processes are performed simultaneously is not reduced in number. Hence, it is possible to perform high speed processing as compared to an image forming apparatus which constantly performs single processing.

Furthermore, in the present embodiment, the upper limit value inquiry section 108 also has a function (reporting means) which reports to the authorization apparatus, upon completion or stopping of the job, final processing result information which is processing result information of a job at the time of completion or termination of the job. The upper limit value inquiry section 108 is notified of the completion of the job or the termination of the job caused by meeting the upper limit value, from the apparatus control section 104.

When the job is completed or when the job stops since the upper limit value is met, the upper limit value inquiry section 108 refers to the count value stored in the count value storage section 106, and transmits to the authorization server 200 this count value and the condition information of the count value, as the final processing result information. This allows for the authorization server 200 to obtain a final number of processed sheets, thereby allowing for accurate balance management. In this case also, just the count value may be transmitted if the authorization server 200 is configured capable of storing the condition information at a time when the previous processable number of sheets was calculated.

Next described is the authorization server 200. As illustrated in FIG. 1, the authorization server 200 includes the transmission-and-reception section 201, the operation section 205, a condition storage section 204, an upper limit value setting section (limit information setting section) 202, and a balance management section (money amount information obtaining section) 203. Among these sections, the upper limit value setting section 202 and the balance management section 203 are implemented by having a CPU of an information processing apparatus or server apparatus which constitutes the authorization server to execute a program loaded on a RAM.

The transmission-and-reception section 201 receives the inquiry information transmitted from the multifunction peripheral 100, and also final processing result information. Moreover, the transmission-and-reception section 201 transmits to the multifunction peripheral 100 the processable number of sheets set by the upper limit value setting section 202.

The exchange of the inquiry for the processable number of sheets and a response to the inquiry with the processable number of sheets, which is carried out between the transmission-and-reception section 201 of the authorization server 200 and the transmission-and-reception section 101 of the multifunction peripheral 100, is carried out by a data command written in any one of markup languages in the group consisting of: HTML, XML, WML, and XHTML. This allows for exchanging information in a generic method.

The transmission-and-reception section 201 transmits the condition information of the first page (initial inquiry) and the changed condition information (re-inquiry) to the upper limit value setting section 202, and transmits the processing result information of the job processed based on the condition information prior to change to the balance management section 203. The condition information of the first page, the changed condition information, and the processing result information are each included in the information in the inquiry.

The balance management section 203 calculates a balance based on (i) the inserted amount inputted from the charging apparatus 300 and (ii) the processing result information of the job processed based on the condition information prior to the change, which processing result information is transmitted from the multifunction peripheral 100. The balance management section 203 calculates a current balance every time the processing result information is received. Information of the calculated balance is outputted to the upper limit value setting section 202.

The upper limit value setting section 202, based on (i) an inserted amount (initial) or balance information (other than initial) received from the balance management section 203 and (ii) condition information received from the multifunction peripheral 100, calculates and sets a processable number of sheets in a case where the process is performed based on that condition information.

Calculation of the processable number of sheets also refers to a parameter of the condition information stored in the condition storage section 204. The condition storage section 204 stores unit prices in accordance with each of the condition information, which unit prices are required for calculating the processable number of sheets.

As described above, the image forming system X of the present embodiment just has the color/black-and-white settings of the specific setting conditions as the condition information. In such a case, the unit price for a colored sheet and the unit price for a black and white sheet are stored in the condition storage section 204.

If the condition information is of color, the upper limit value setting section 202 divides the inserted amount (initial) or the balance information (other than initial) by the unit price for color sheets, and sets an integer value of its quotient as the processable number of sheets.

The condition information stored in the condition storage section 204 and the unit price corresponding to the condition information are changeable by use of the operation section 205. The operation section 205 is a user interface of an information processing apparatus or a server apparatus which constitutes the authorization server 200.

Figure 3:
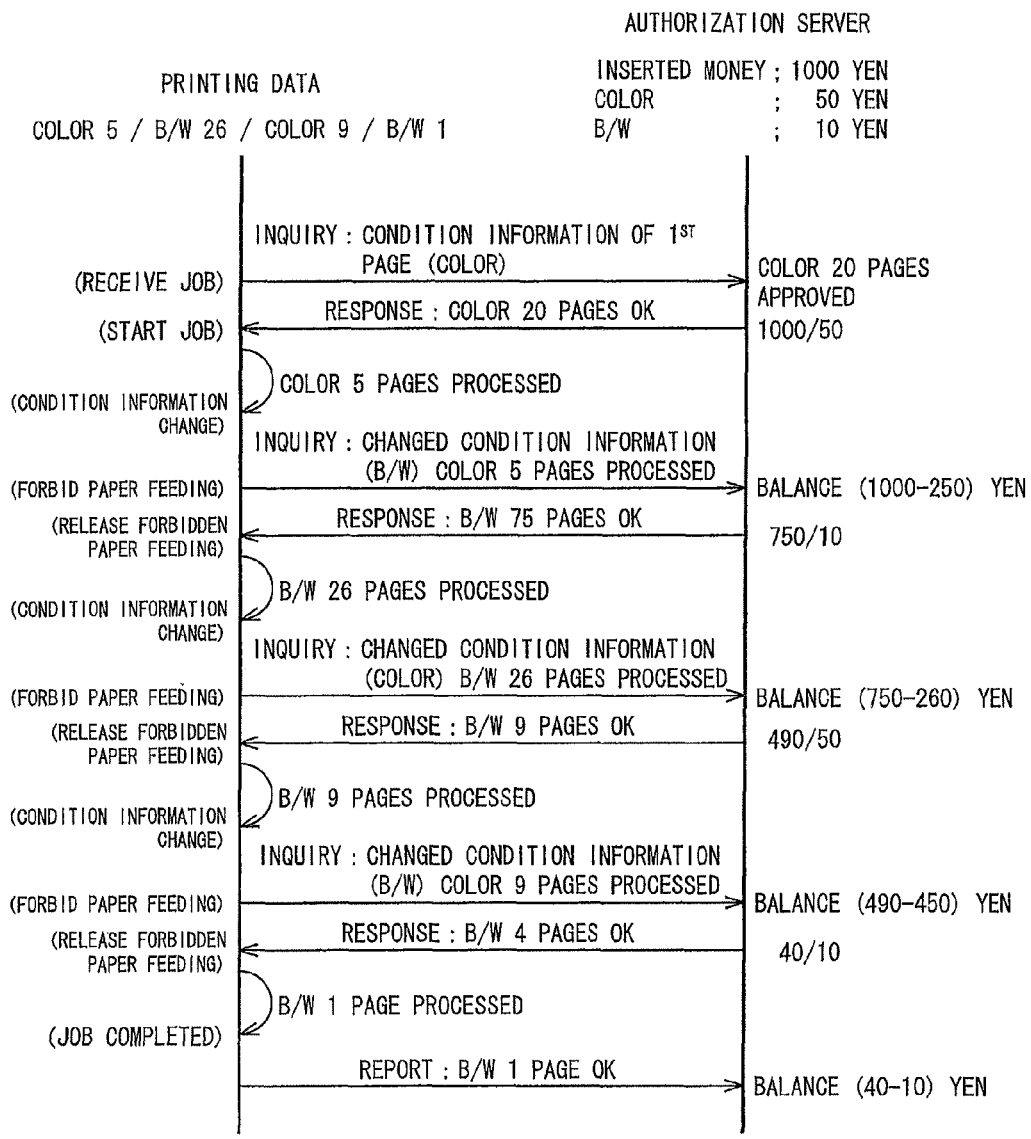
FIG. 3 is a view describing an exchange of information (signals) carried out between a multifunction peripheral and an authorization server in performing an image processing job in the image forming system.

FIG. 3 illustrates an exchange of information (signals) carried out between the multifunction peripheral 100 and the authorization server 200 in performing the image processing job by use of the multifunction peripheral 100 in the image forming system X. The example of FIG. 3 illustrates an exchange of a case where printing data in which a total of 41 pages including a mixture of color pages and black and white pages is processed based on an inserted amount of 1,000 yen, where a breakdown of the printing data including the color and black-and-white pages is as follows: 5 color pages (consecutive), 26 black and white pages (consecutive), 9 color pages (consecutive), and 1 black and white page. The unit price is 50 yen for each color sheet, and 10 yen for each black and white sheet.

The multifunction peripheral 100 makes an initial inquiry to the authorization server 200 upon receiving an execution instruction of an image forming job. In this example, the multifunction peripheral 100 transmits the condition information of the first page, i.e., that the first page is of a color setting.

Upon receiving this inquiry, the authorization server 200 sets the processable number of sheets as "20", a quotient obtained as a result of dividing the inserted amount of 1,000 yen by the unit price for the color processing, and responds with an approved result of "20 color sheets OK".

Upon reception of this response, the multifunction peripheral 100 starts the job, and processes the consecutive 5 pages of color sheets. After the $5^{th}$ recording sheet is fed, the condition setting for the $6^{th}$ page is confirmed. When it is detected that the condition information is changed from color to black and white, the multifunction peripheral 100 forbids the paper feeding of the $6^{th}$ recording sheet, and another inquiry is made to the authorization server 200. In this example, the multifunction peripheral 100 transmits the condition information of the $6^{th}$ page which is that the $6^{th}$ page is of a black and white setting, and that 5 color sheets have already been processed.

The authorization server 200, upon receiving this re-inquiry, sets a quotient "75" as the processable number of sheets, which quotient is obtained as a result of dividing a balance 750 yen that remains after the 5 color sheets have been processed from an inserted amount of 1,000 by the unit price for the black and white processing, and responds with an approved result of "75 black and white sheets OK".

Upon reception of this response, the multifunction peripheral 100 releases the forbidden state of the paper feeding, and processes the 26 consecutive black and white pages from the $6^{th}$ page to the $31^{st}$ page. After the $31^{st}$ recording sheet is fed, the condition setting for the $32^{nd}$ page is confirmed. When the multifunction peripheral 100 detects the change in condition information from black and white to color, the feeding of the $32^{nd}$ recording sheet is forbidden, and another inquiry is made to the authorization server 200. In this example, the multifunction peripheral 100 transmits the condition information of the $32^{nd}$ page which is that the $32^{nd}$ page is of the color setting, and that 26 black and white sheets have already been processed.

Upon receiving this re-inquiry, the authorization server 200 sets the processable number of sheets as "9" which is a quotient obtained by dividing a balance 490 yen after 26 black and white sheets have been processed from the previous balance of 750 yen by the unit price for color processing. Thereafter, a response is provided of an approved result of "9 color sheets OK".

Upon receiving this response, the multifunction peripheral 100 releases the forbidden state of the paper feeding, and performs the processing for the 9 consecutive color pages from the $32^{nd}$ page to the $40^{th}$ page. After the $40^{th}$ recording sheet is fed, the condition setting of the $41^{st}$ page is confirmed. When the multifunction peripheral 100 detects that the condition information changes from color to black and white, the multifunction peripheral 100 forbids the paper feeding of the recording sheet of the $41^{st}$ page, and again makes an inquiry to the authorization server 200. In this inquiry, the multifunction peripheral 100 transmits that the condition information of the $41^{st}$ page is that of a black and white setting, and that already 9 color pages have been processed.

Upon receiving this inquiry, the authorization server 200 sets the processable number of sheets as "4", which is a quotient as a result of dividing a balance 40 yen after 9 color sheets have been processed from the previous balance of 490 yen based on the unit price for the black and white processing. Thereafter, a response is provided of an approved result of "4 black and white sheets OK".

Once this response is received, the multifunction peripheral 100 releases the forbidden state of the paper feeding, and performs the 1 black and white processing of the $41^{st}$ page. This completes the job. Thereafter, the multifunction peripheral 100 transmits, as a final processing result, that 1 black and white sheet was processed.

The authorization server 200 receives this final processing result, and transmits to the charging apparatus 300 to return 30 yen as a result of processing 1 black and white sheet from the previous balance of 40 yen.

Figure 4:
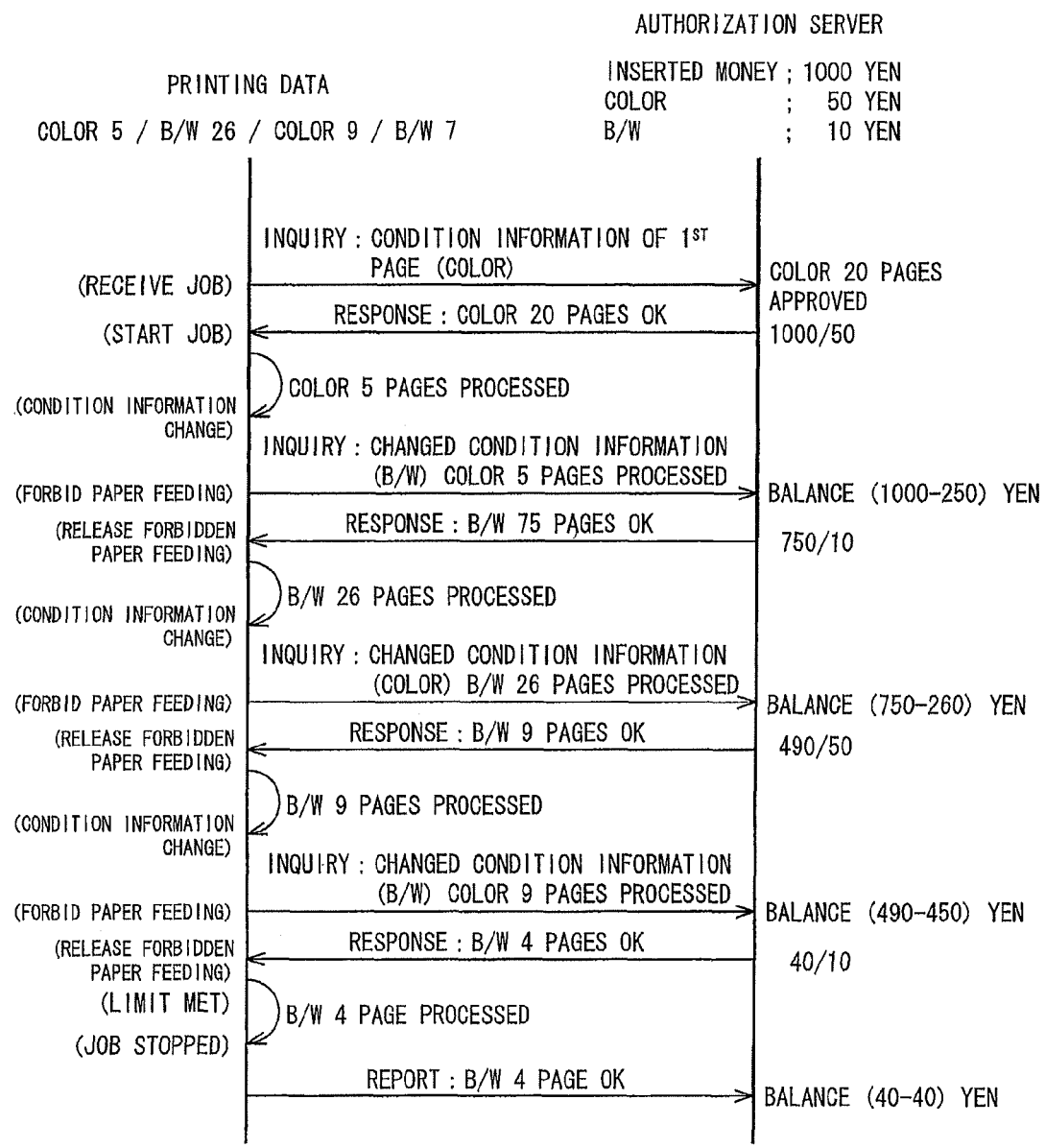
FIG. 4 is a view describing an exchange of information (signals) carried out between a multifunction peripheral and an authorization server in performing another image processing job in the image forming system.

On the contrary, FIG. 4 illustrates a case where the limit is met while the job is in process, and the process is stopped in the middle of performing the job. FIG. 4 differs from FIG. 3 in the printing data. The printing data in the example of FIG. 3 is a total of 41 pages including a mixture of color pages and black and white pages, where the pages are 5 color pages (consecutive), 26 black and white pages (consecutive), 9 color pages (consecutive), and 1 black and white page. On the other hand, in the example of FIG. 4, there are 7 pages (consecutive) of the last black and white pages. The inserted amount of money and the unit price settings are all identical to the example of FIG. 3.

As shown in the last stage in FIG. 4, upon reception of the an approval result of "4 black and white sheets OK" from the authorization server 200, the multifunction peripheral 100 releases the forbidden state of the paper feeding, and attempts to process the 7 black and white sheets from the $41^{st}$ page to the $47^{th}$ page. However, since the calculated value by the calculation section 111 becomes 0 (zero) at a point where 4 sheets have been processed, the job is stopped at this point. Thereafter, the multifunction peripheral 100 transmits as a final processing result that 4 black and white sheets have been processed. The authorization server 200 receives this final processing result, and transmits to the charging apparatus 300 to return 0 yen as a result of processing 4 black and white sheets from the previous balance of 40 yen.

In the examples of FIG. 3 and FIG. 4, the number of times an inquiry is made from the multifunction peripheral 100 to the authorization server 200 is just a total of 4 times, including the initial inquiry and the 3 times that the condition information is changed. Hence, it is possible to remarkably reduce the number of times the inquiry is made as compared to the case where an inquiry is made per process of 1 page (1 sheet), which totals to the number of 41 times. The effect brought about by such a reduction in the number of inquiries is recognized more with a large number of sheets to be processed and with a small number of changes in the condition information with respect to the total number of sheets to be processed in the job. Accordingly, it is possible to remarkably improve the performance of the multifunction peripheral 100.

Figure 5:
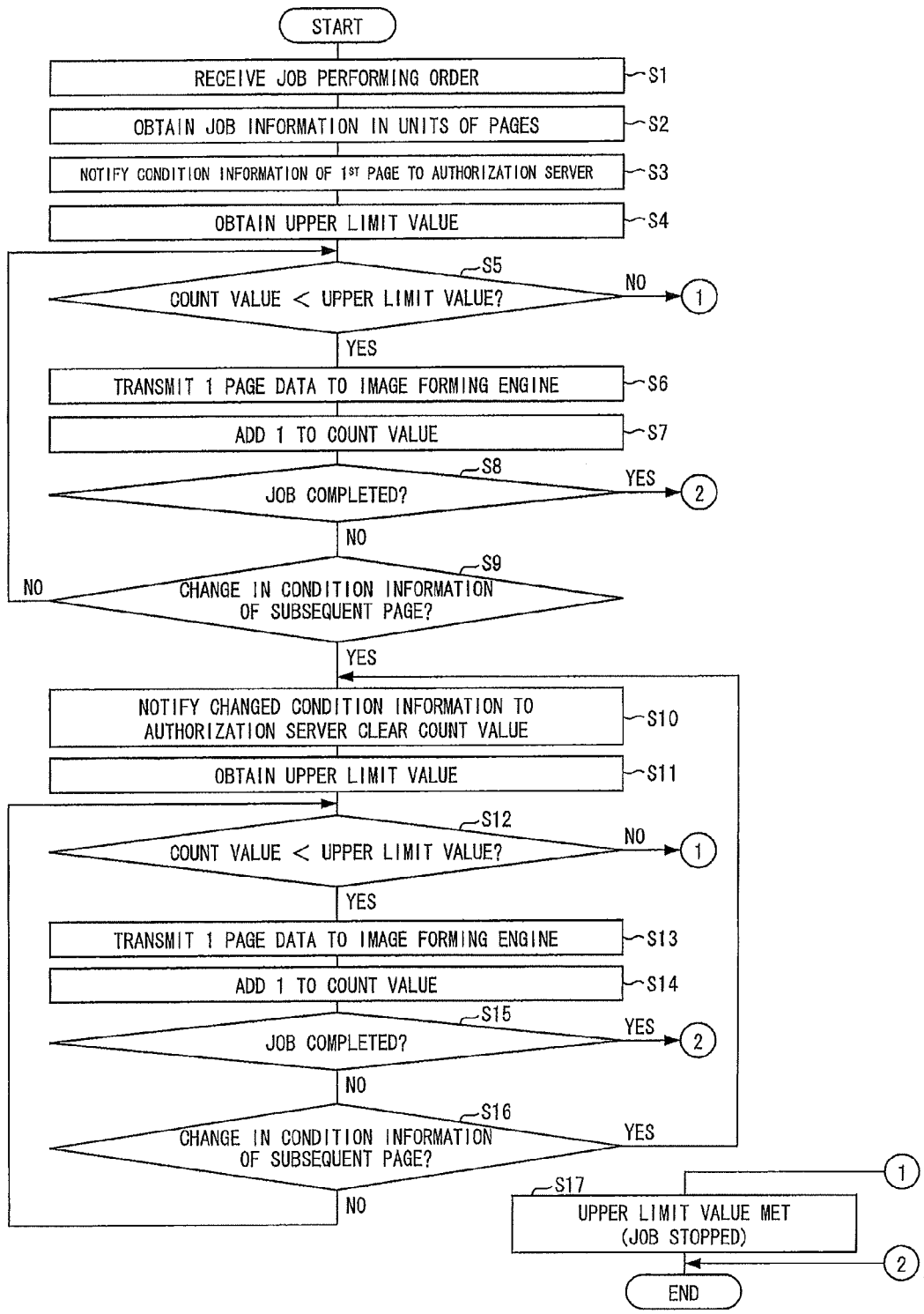
FIG. 5 is a flow chart illustrating a procedure of processes carried out when a multifunction peripheral in the image forming system performs an image forming job within a limit approved by an authorization server.

The flow chart illustrated in FIG. 5 shows a procedure of processes for performing an image forming job by use of the multifunction peripheral 100 within a limit approved by the authorization server 200.

The multifunction peripheral 100, upon receiving an execution order of a job (S1), obtains job information by units of pages (S2). From among the obtained job information, the multifunction peripheral 100 refers to a specific setting condition of the $1^{st}$ page, and notifies the authorization server 200 of the condition information of the $1^{st}$ page (S3). In response, the authorization server 200 transmits back a processable number of sheets that corresponds to the condition information of the $1^{st}$ page. The multifunction peripheral 100 receives the transmitted processable number of sheets, and obtains an upper limit value, i.e. the processable number of sheets (S4).

After the upper limit value is obtained, the multifunction peripheral 100 compares a count value (processed number of sheets) in the count value storage section 106 with the upper limit value (S5). In a case where the count value is not less than the upper limit value, the process proceeds to S17. This causes the job to stop since the upper limit value has been met, and the process is terminated.

On the other hand, if the count value is smaller than the upper limit value, data of 1 page is transmitted to the image forming engine 20 to start the processing of the $1^{st}$ page (S6). Moreover, after the data of 1 page is transmitted to the image forming engine 20, the count value in the count value storage section 106 is added to by 1 (S7).

Subsequently, determination is made on whether or not the job is completed (S8). If it is determined as being completed, the process is terminated.

On the other hand, if it is determined in S8 that the job is not completed, determination is made on whether there is a change in the condition information of a subsequent page (S9). If it is determined here that there is no change, the process returns to S5, and in a case where the count value is within the upper limit value, data of the subsequent page is transmitted to the image forming engine 20 to perform the process of the subsequent page. The processes from S5 to S9 are repeated until it is determined in S9 that there is a change in the condition information. Meanwhile, if it is determined in S5 that the count value is equal to or more than the upper limit value or is determined in S8 that the job is completed, the process is terminated.

If it is determined in S9 that there is a change in the condition information, the changed condition information is notified to the authorization server 200 together with the processed number of sheets processed based on the condition information prior to the change (S10). This causes the authorization server 200 to transmit a processable number of sheets that corresponds to the changed condition information. The multifunction peripheral 100 receives the transmitted processable number of sheets, and resets the upper limit value (S11). Moreover, in S10, the count value in the count value storage section 106 is reset to 0 (zero) simultaneously with the notifying of the authorization server 200.

When a new upper limit value is obtained which corresponds to the changed condition information, the multifunction peripheral 100 compares the count value (processed number of sheets) in the count value storage section 106 with the upper limit value (S12). If the count value is smaller than the upper limit value, the multifunction peripheral 100 transmits to the image forming engine 20 data of 1 page whose condition information is changed, to start the process (S13). Thereafter, similarly with S7, after the data of 1 page is transmitted to the image forming engine 20, the count value in the count value storage section 106 is increased by 1 (S14). Subsequently, determination is made on whether or not the job is completed (S15), and if it is determined that the job is not completed, determination is made on whether or not there is a change in the condition information of the subsequent page (S16). If it is determined as having no change, the process returns to S12, and in a case where the count value is smaller than the upper limit value, the multifunction peripheral 100 transmits the data of the subsequent page to the image forming engine 20 to perform the process of the subsequent page. Thereafter, as with the processes from S5 to S9, the processes from S12 to S16 are repeated until it is determined in S16 that there is a change in the condition information. Meanwhile, if it is determined in S12 that the count value is equal to or greater than the upper limit value, or if it is determined in S15 that the job is completed, the process is terminated.

On the other hand, if it is determined in S16 that there is a change in the condition information, the process returns to S10 and the changed condition information is notified to the authorization server 200 together with the processed number of sheets processed based on the condition information prior to the change, to reset the upper limit value (S11). Thereafter, the processes from S12 to S16 are repeated as with the processes from S5 to S9. While the processes from S12 to S16 are being repeated, if it is determined in S12 that the count value is equal to or more than the upper limit value or is determined in S15 that the job is completed, the process is terminated.

Although omitted in illustration from the flow chart of FIG. 5, if it is determined in S8 or S15 that the job is completed, or if the job is stopped in S17 caused by the count value meeting the upper limit value, an inquiry is made to the authorization server 200 immediately before the process is terminated, and thereafter, a process of reporting the number of processed sheets is performed by the multifunction peripheral 100.

As described above, in the multifunction peripheral 100, the upper limit value inquiry section 108 transmits to the authorization server 200 the condition information related to the process to the $1^{st}$ page, in performing the image forming job, to make an inquiry of the processable number of sheets in a case where the process is performed based on that condition information. Furthermore, every time the condition information changes for a page to be processed subsequently, the upper limit value inquiry section 108 transmits the changed condition information and the processing result information obtained as a result of processing based on the condition information prior to the change, to the authorization server 200, to make an inquiry of the processable number of sheets in the case where the process is to be performed based on the changed condition information. Meanwhile, once the processable number of sheets is obtained as a result of the initial inquiry, the apparatus control section 104 causes the job to start. If a change in the condition information is detected, the apparatus control section 104 forbids the processing to a new recording sheet, and upon obtaining a new processable number of sheets as a result of making another inquiry, the forbidden state of the processing to a new recording sheet is released.

As such, in the foregoing configuration, the number of inquiries made to the authorization server 200 for the processable number of sheets is reduced to just the initial inquiry and whenever there is a change to the condition information. Hence, it is possible to reduce the number of inquiries in most cases, except for a few exceptions, as compared to a configuration in which an inquiry for a processable number of sheets is made to the authorization apparatus for each page. As a result, in a case where the number of sheets to be processed is large in amount, it is possible to perform the image forming process while preventing the decrease in performance of the image forming apparatus to the least possible.

Embodiment 2

One embodiment of the present invention is described below, with reference to FIG. 6 to FIG. 13. The present embodiment exemplifies an image forming system in which a process performed by a multifunction peripheral located in an office or the like is limited to within a limited number of sheets set per user by the authorization server.

For easy explanation, members having identical functions as the members used in Embodiment 1 are provided with identical reference signs, and explanation thereof are omitted in the embodiment.

FIG. 6 is a block diagram schematically illustrating a configuration of an image forming system Y according to the present embodiment. In the image forming system Y, a multifunction peripheral (image forming apparatus) 100A, an authorization server (authorization apparatus) 400, and an application server 500 are connected to each other via the communications network 60 such as the Internet, Intranet or the like.

Description of Multifunction Peripheral 100A

A multifunction peripheral 100A of the present embodiment is similar to the multifunction peripheral 100 of Embodiment 1, however is different in that the multifunction peripheral 100A further includes an authorization inquiry section 115, and that the upper limit value inquiry section (continuation permission inquiry section) 108 makes an inquiry for receiving permission of continuing with the job at a time when the upper limit value is met.

First described is the authorization inquiry section 115. The authorization inquiry section 115 performs the following processes. When a user is to use the multifunction peripheral 100A, the user is to enter verification information (e.g. user login name and password), to transmit the entered verification information to the authorization server 400 for user authentication.

When a signal of authentication OK is received, the multifunction peripheral 100A stores the user ID returned from the authorization server 400 and displays an initial screen such as an application selection screen, on the operation section 103.

When the logged-in user selects on the application selection screen an application to be executed, an execution request of the selected application is transmitted to the application server 500.

Information related to applications is, for example, an application name, a printing condition of the job to be performed set by the user at a time when the printing job is to be performed (e.g. color setting information, double-side setting information, intensive setting information, etc.), or a domain name or the like of an application server on which the application is stored.

The upper limit value inquiry section 108 notifies the authorization server 400 of job performing continuation permission inquiry information at a time when the upper limit value is met. The job performing continuation permission inquiry information includes a count value stored in the count value storage section 106 and condition information of the count value.

Description of Authorization Server 400

Next described is a configuration of the authorization server 400. The authorization server 400 includes an authorization section 401, an upper limit value setting section 403, and a transmission-and-reception section 201.

The authorization section 401 receives from the multifunction peripheral 100A verification information (login name, password) entered by the user, and verifies this information by matching it with a user information management database 402. If it is verified, a signal of authentication OK and a user ID is returned, and if it is not verified, a signal of authentication NG is returned.

The user information management database 402 stores information related to the user authentication and the number of sheets usable by a user.

As the information related to the user authentication, the user ID and the verification information (login name and password) are stored, to identify a user who can use the multifunction peripheral 100A.

Moreover, as the information related to the number of sheets usable by the user, an accumulated used number of sheets, an upper limit value of a usable number of sheets and like information are stored for each user ID. The accumulated used number of sheets is an accumulation of the number of processed sheets that the user has used. The upper limit value of the number of sheets used is an upper limit value of the number of processing sheets allotted to the user for limiting the number of usable sheets. In a case where the accumulated number of used sheets meets this upper limit value, the performing of the process stops.

The upper limit value of the number of usable sheets is set in accordance with condition information set with the multifunction peripheral 100A in advance. As with Embodiment 1, for simple explanation, the present embodiment exemplifies a case where just the color/black-and-white setting serves as the condition information, among the setting conditions.

The upper limit value setting section (limit information setting section, continuation permission determination section) 403 responds to an inquiry from the multifunction peripheral 100A of the processable number of sheets corresponding to condition information, with reference to the user information management database 402.

Moreover, when the processed number of sheets meets the upper limit value in the multifunction peripheral 100A and a job performing continuation permission inquiry is notified from the multifunction peripheral 100A, the upper limit value setting section 403 refers to an application information database 404 storing information such as information described below and verifies the information in the application information database 404 with information received from the multifunction peripheral 100 related to the application, to determine an operation (continuation OK or continuation NG) of the job performing.

(1) Whether or not it is possible to continue performing of the job is stored associated with a corresponding application name as illustrated in FIG. 7, and this information is compared to the information (application name) related to the application received from the multifunction peripheral 100A, to determine whether or not the performing of the job can be continued.

(2) Whether a use condition of the application is charged or is free of charge is stored associated with a corresponding application name as illustrated in FIG. 8, and in a case where the application received from the multifunction peripheral 100A is charged it is determined that the job can be continued, and in a case where the application is free of charge, it is determined that the job cannot be continued.

(3) Setting conditions (e.g. color setting information, double-side setting condition, intensive setting condition etc.) of applications are stored associated with a corresponding application name as illustrated in FIG. 9, and in a case where the setting information of the performed job satisfies the setting conditions of the application corresponding to the application received from the multifunction peripheral 100A, it is determined that the job can be continued, however if the setting information does not satisfy the setting conditions, it is determined that the job cannot be continued.

For instance, in a case where the user is requesting to perform a job under the condition of FIG. 9 with use of application 1 in which (i) the color setting is set as black and white printing, (ii) the double-side setting is set as the double-side printing, and (iii) the intensive setting is set to fit and print 2 pages into 1 page, the job is allowed to be continued since the processing conditions of the application 1 stored in the application information database 404 is satisfied, although the upper limit value of the black and white image forming process is met. As a result, the performing of the job is continued.

On the other hand, if the user requests to perform a job with use of application 1 under the settings of (i) the color printing as the color setting, (ii) the double-side printing as the double-side setting, and (iii) fitting 4 pages into 1 page to print as the intensive setting, the job is determined as not allowed to be continued when the upper limit value of the color image forming process is met, since the processing condition of the application 1 is not satisfied. As a result, the processing of the job is stopped.

(4) Domain names to which the application server belongs are stored, as illustrated in FIG. 10; if information related to the application (domain name to which the application server storing the application belongs) received from the multifunction peripheral 100A is stored, it is determined that the job can be continued, and if this information is not stored, it is determined that the job cannot be continued.

If all executable applications in the application server are set so that the printing is continued even if the limit of the number of usable sheets is met, no setting would be required for each of the application in the application information database 404. This makes the registration work easy.

Moreover, if no information related to the applications is stored in the application information database 404, the job is determined as not being able to be continued.

Description of Application Server 500

Next described is a configuration of the application server 500. The application server 500 stores one or more of application software, and executes an application software designated upon request from the multifunction peripheral 100A. This application requests to perform the printing process by the image forming job in communication with the multifunction peripheral 100A which requests for the execution of the application.

Description of Printing Procedures

Figure 11:
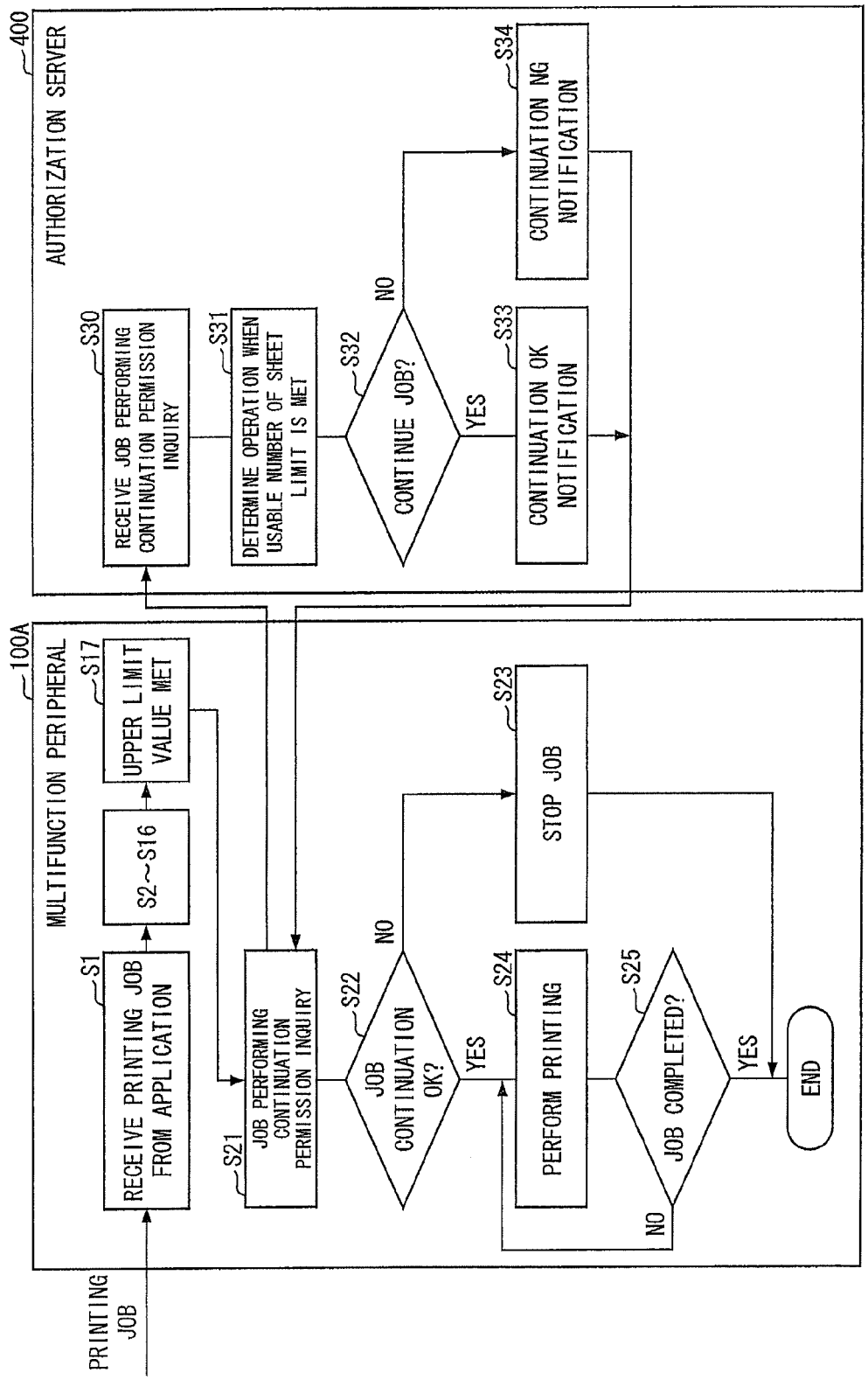
FIG. 11 is a flow chart illustrating operations carried out by a multifunction peripheral and an authorization server in an image forming system according to another embodiment of the present invention, when a printing job is received from an application.

The following description explains operations of the multifunction peripheral 100A and the authorization server 400 when a printing job is received from the application, with reference to a flow chart illustrated in FIG. 11.

The multifunction peripheral 100A, upon receiving a printing job from an application active in the application server 500 (S1), performs the processes from S2 to S16 in the flow chart shown in FIG. 5 used in describing Embodiment 1. However, in the present embodiment, the user ID and the information related to the application are also transmitted to the authorization server 400 in the initial inquiry in S3.

If the processed number of sheets meet the upper limit value in S5 or S12 while the processes from S2 to S16 are performed, the job is stopped in the flow chart in FIG. 5. In the present embodiment, the process proceeds to S21 shown in FIG. 11, and transmits to the authorization server 400 the job performing continuation permission inquiry information.

If a response is received from the authorization server 400 that the job can be continued (YES in S22), the job is continued to perform the printing (S24). This printing is performed until it is determined in S25 that the job is completed, and once it is determined that the job is completed, the process is terminated.

On the other hand, if a response is received from the authorization server 400 that the job cannot be continued (NO in S22), the job is stopped, and the process is terminated.

Although also omitted in illustration from FIG. 11 as with the flow chart of FIG. 5, if it is determined in S25 that the job is completed, or in a case where the job is stopped in S23, an inquiry for a latest processable number of sheets is made to the authorization server 400 immediately before the process is terminated, and thereafter, a process of reporting the number of processed sheets is performed by the multifunction peripheral 100A.

On the other hand, in the authorization server 400, upon receiving the job performing continuation permission inquiry information from the multifunction peripheral 100A (S30), determination is made on whether not the job can be continued or not with reference to the application information database 404, based on the information related to the application received from the multifunction peripheral 100A (S31).

If it is determined in S31 to continue the job (YES in S32), a job continuation OK notification is returned to the multifunction peripheral 100A (S33). On the other hand, if it is determined to not continue the job (NO in S32), job continuation NG notification is returned to the multifunction peripheral 100A (S34).

Modification 1

In Embodiment 2, if it is determined that the printing is to be continued, the printing is performed based on the printing conditions set by the user even if the number of the used sheets exceeds the upper limit value thereof. The present Modification 1 is a case where, if the printing is performed exceeding the upper limit value, the printing is performed by having the printing conditions be replaced by those which save resources such as paper and toner in the multifunction peripheral.

According to the present Modification 1, in performing the printing after the upper limit value is exceeded, printing may be performed by replacing color printing with black and white printing, or several pages may be fitted into one page in printing, to save resources such as paper and toner.

The apparatus control section 104 of the multifunction peripheral 100A, upon receiving the job performing continuation notification from the authorization server 400, changes the printing conditions to those which save resources such as paper and toner regardless of the setting information of the printing job set by the user, and performs the printing based on the changed printing condition, for each printing job.

Figures 12, 13:
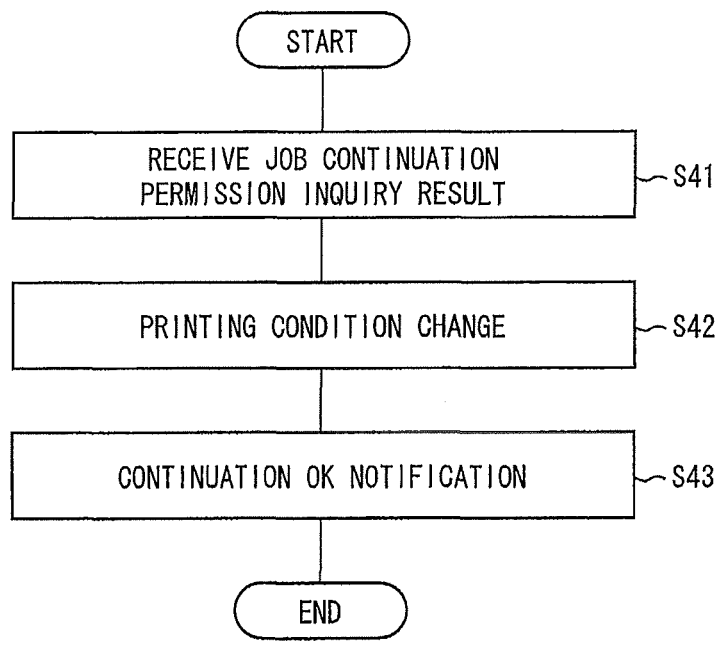
FIG. 12 is a flow chart illustrating a procedure of processes in an image forming system according to another embodiment of the present invention, for changing a printing condition in accordance with a result of an execution continuation permission inquiry, by an apparatus control section of a multifunction peripheral.
FIG. 13 illustrates an example of the number of sheets that an upper limit setting section of an authorization server adds to an upper limit value of the usable number of sheets, in an image forming system according to another embodiment of the present invention.

S41 through S43 of FIG. 12 illustrates a flow chart showing a procedure of processes of the present Modification 1 in the apparatus control section 104. This replaces S21 to S24 in FIG. 11.

If the setting information of the printing job set by the user is more capable of saving the resources such as paper and toner as compared to the printing condition for saving the resources, the conditions may stay as the setting information set by the user. For instance, if the setting information by the user is 6-up and the printing condition set in advance is 4-up, printing is carried out as 6-up.

Modification 2

In the Embodiment 2 described above, no printing can be performed other than the printing job from a specific application, after performing the printing that exceeds the upper limit value.

The present Modification 2 makes it possible to perform a subsequent printing job by changing the upper limit value of the number of usable sheets by the user at a time when the printing is terminated, so that it is treated as though no printing that exceeds the upper limit value was performed.

The upper limit value setting section 403 of the authorization server 400 has a table which stores a number of sheets to be added to the upper limit value of the number of usable sheets by the user, in accordance with a corresponding application. At the time when the printing of the printing job is terminated, the table is referred to, to obtain the number of sheets corresponding to the application from which the performing of the printing job was requested. This obtained number of sheets is added to the upper limit value, to update the upper limit value of the number of usable sheets by the user.

For example, as illustrated in FIG. 13, the number of sheets stored in the table is either "performed number of sheets", "0 (zero) sheets" or "any number of sheets", and the "performed number of sheets" denotes the number of sheets printed in the printing job, the "0 sheets" denotes that no number of sheets is added, and "n sheets" denotes any number of sheets that is set as the number of sheets to be added. The addition of the performed number of sheets results as a state identical to a state where no printing job has been performed by the application.

Figure 14:
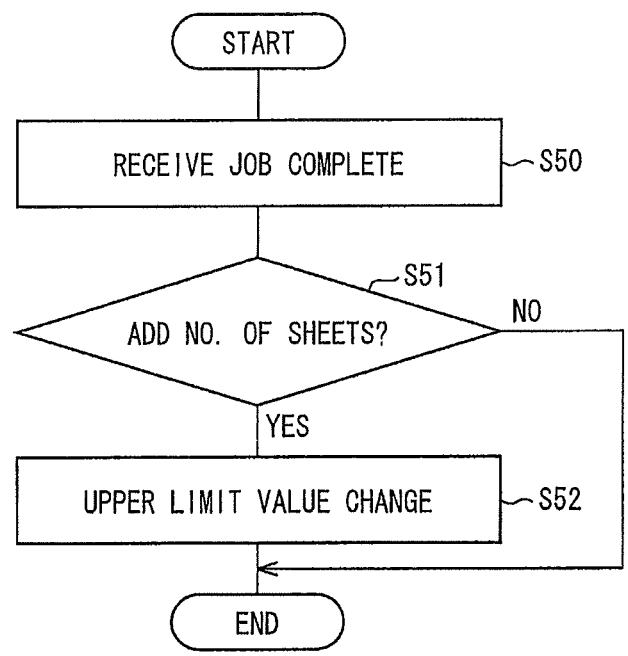
FIG. 14 is a flow chart illustrating a procedure of processes of an upper limit value setting section of the authorization server to change an upper limit value of a usable number of pages upon completion of the printing, in the image forming system according to another embodiment of the present invention.

FIG. 14 is a flow chart illustrating a procedure of processes in the present Modification 2, performed in the upper limit value setting section 403 of the authorization server 400.

Conventionally, a user that has met their limit in the usable number of sheets cannot perform a printing job until the limit of the usable number of sheets is modified by a system administrator. However, by increasing the upper limit value of the usable number of sheets after the printing job is performed by carrying out S51 and S52 upon receiving a job completion report (S50) as in the present Modification 2, the user becomes capable of carrying out a subsequent job.

This modification is effective for use in cases where a limit in the number of sheets used is set for private printing, however for printing for example teaching material for lessons or the like which cannot be avoided, no limit is set on the number of sheets to be used.

Embodiment 3

Described below is one embodiment of the present invention, with reference to FIG. 15 and FIG. 16. Similarly to Embodiment 2, the present embodiment also exemplifies an image forming system in which an authorization server limits a process performed by a multifunction peripheral located in an office or the like to be within a limited number of sheets set respectively for each user.

For easy explanation, members having the same functions as those used in Embodiments 1 and 2 are provided with identical reference signs, and their descriptions have been omitted here.

Description of Multifunction Peripheral 100B

The multifunction peripheral 100B of the present embodiment is different from the multifunction peripherals of Embodiments 1 and 2 in a point that condition information of pages is analyzed while the job processing is in process, independently from the image forming process performed by the image forming engine 20, and in a case where there is a change in the condition information, the multifunction peripheral 100B makes an inquiry to the authorization server 200 of the processable number of sheets without waiting for the completion of the image forming process performed based on the condition information prior to the change.

Figure 15:
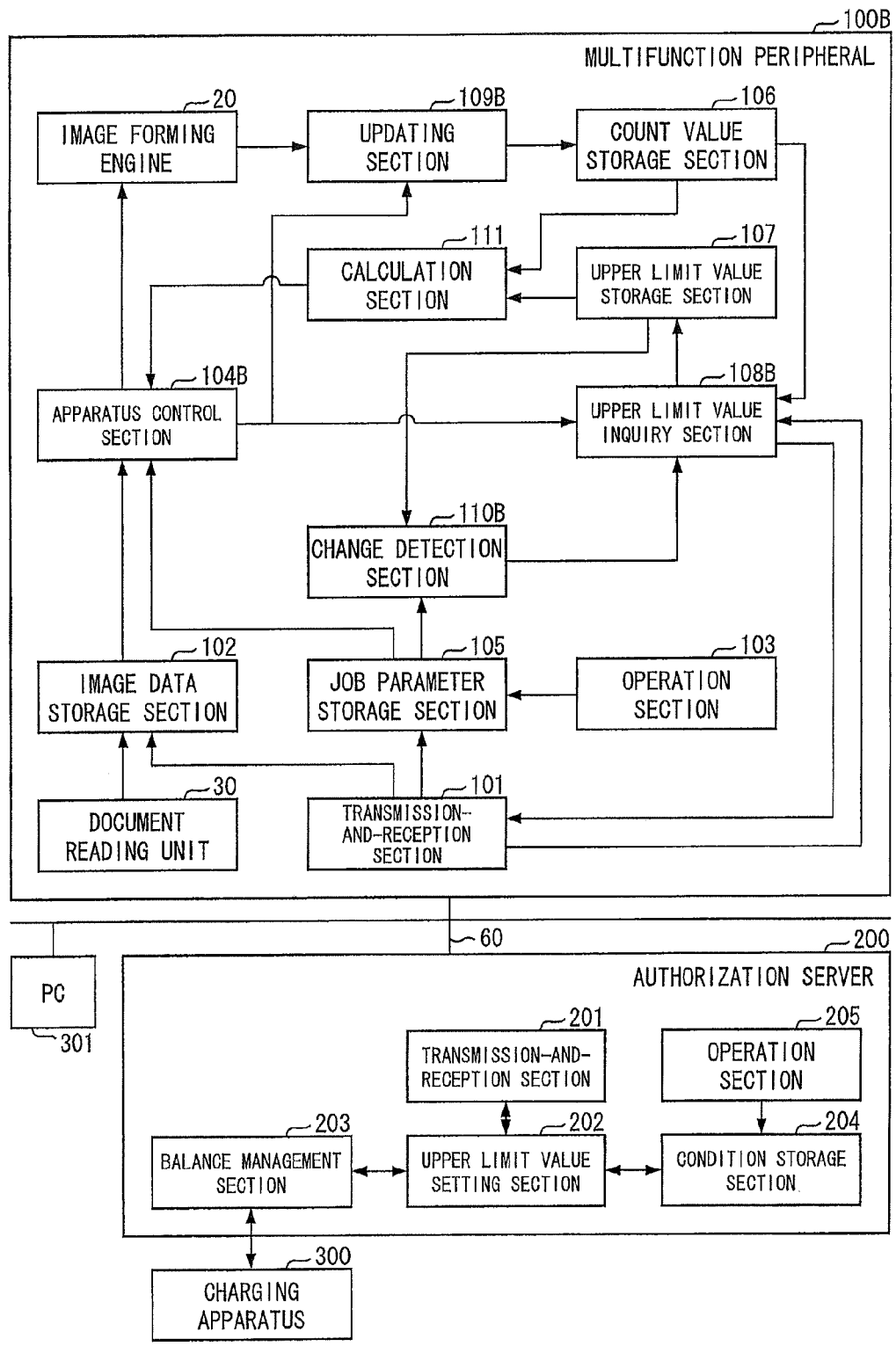
FIG. 15 is a block diagram schematically illustrating an image forming system according to another embodiment of the present invention.

As illustrated in FIG. 15, the multifunction peripheral 100B of the present embodiment respectively includes the following members instead of the change detection section 110, the upper limit value inquiry section 108, the apparatus control section 104, and the updating section 109: a change detection section 110B, an upper limit value inquiry section 108B, an apparatus control section 104B, and an updating section 109B. The present embodiment exemplifies a modification of the multifunction peripheral 100 of Embodiment 1, however it is also possible to apply a similar modification to the multifunction peripheral 100A of Embodiment 2.

The change detection section 110B analyzes condition information of each page while the job is in process, independently from the process performed by the image forming engine 20, to detect whether or not there is a change in the condition information. The change detection section 110 of Embodiment 1 (Embodiment 2) has a configuration in which whether or not there is a change in the condition information is confirmed each time a process of one sheet is performed by the image forming engine 20. On the contrary, the change detection section 110B of the present embodiment detects a change in the condition information regardless of the process performed by the image forming engine 20, by referring to the specific setting information of each page, which information is stored in the job parameter storage section 105. Namely, if the printing job is a job including 20 pages of image data, the change detection section 110B successively analyzes the condition information of the 20 pages of the image data, and detects information such as that the condition information is changed between a $N^{th}$ page and an $N+1^{th}$ page, between a $N+5^{th}$ page and an $N^{th}$ page, and so on, without having any relation to the image forming process.

When the change detection section 110B detects that there is a change in the condition information, the change detection section 110B transmits to the upper limit value inquiry section 108B (i) changed condition information #2 which has been subjected to the change and (ii) information of the number of processing sheets to be processed based on the condition information #1 prior to the change. In the case where the change detection section 110B detects that the condition information is to change from #1 to #2 from a certain page, the change detection section 110B determines whether the number of pages being processed based on the condition information #1 prior to the change (including pages already processed) is within the range of the upper limit value stored in the upper limit value storage section 107.

If the number of pages being processed based on the condition information #1 prior to the change is within the range of the upper limit value, the change detection section 110B transmits to the upper limit value inquiry section 108B, the changed condition information #2 and the number of sheets being processed based on the condition information #1 prior to the change as information of the number of processing sheets being processed based on the condition information #1 prior to the change.

Upon receiving the information of the number of processing sheets to be processed based on the condition information #1 prior to the change and the changed condition information #2, the upper limit value inquiry section 108B transmits inquiry information to the authorization server 200 via the transmission-and-reception section 101 which inquires a processable amount of sheets based on the changed condition information #2, and obtains a new processable number of sheets from the authorization server 200 (re-inquiry).

After the upper limit value inquiry section 108B obtains the new processable number of sheets from the authorization server 200, the upper limit value inquiry section 108B holds this until the image forming process based on the condition information #1 prior to the change is completed. Once the image forming process is completed, the upper limit value inquiry section 108B updates the upper limit value data stored in the upper limit value storage section 107.

Moreover, if the change detection section 110B detects another change in the condition information (from #2 to #3) after the change detection section 110B transmits to the upper limit value inquiry section 108B the changed condition information #2 and the information of the number of processing sheets being processed based on the condition information #1 prior to the change, the change detection section 110B determines, similarly to the above, whether or not the number of pages being processed based on the condition information #2 prior to the another change is within a range of the processable number of sheets of the condition information #2 stored in the upper limit value storage section 107 or held in the upper limit value inquiry section 108B.

Thereafter, if the pages being processed based on the condition information #2 prior to the another change is within the range of the processable number of sheets, the change detection section 110B transmits the number of pages being processed based on the condition information #2 prior to the another change to the upper limit value inquiry section 108B as information of the processed number of pages being processed based on the condition information #2 prior to the another change, together with the changed condition information #3. If the number of pages being processed based on the condition information #2 prior to the another change exceeds the range, just the condition information #2 prior to the another change is transmitted to the upper limit value inquiry section 108B.

When the upper limit value inquiry section 108B receives from the change detection section 110B the information of the number of processing sheets being processed based on the condition information #2 prior to the another change and the changed condition information #3, the upper limit value inquiry section 108B transmits to the authorization server 200, as with the foregoing processes, inquiry information for inquiring the processable number of sheets based on the changed condition information #3, to obtain a new processable amount of sheets (re-inquiry). Thereafter, after receiving a new processable number of sheets from the authorization server 200, the upper limit value inquiry section 108B holds this information until the image forming process is completed based on the condition information #1 and #2 prior to the change, and when the image forming process based on the condition information #1 and #2 are completed, the upper limit value data stored in the upper limit value storage section 107 is updated.

The apparatus control section 104B notifies the upper limit value inquiry section 108B that the image forming process based on the condition information #1 and #2 prior to the change is completed.

As described above, in the multifunction peripheral 100B of the present embodiment, the change detection section 110B determines whether or not there is a change in the condition information by referring to the specific setting information of the job in the job parameter storage section 105, and when a change is detected, the upper limit value inquiry section 108B makes an inquiry to the authorization server 200 of a processable number of sheets based on the condition information to obtain the processable number of sheets of each of the condition information, without waiting for the image forming process of the image forming engine 20 to be completed.

On the other hand, the apparatus control section 104B causes the job to start upon receiving the processable number of sheets (processable number of sheets based on the condition information #1). The apparatus control section 104B performs an image forming process of image data on a page entered from the image data storage section 102, by controlling each of sections of the image forming engine 20 based on the specific setting information including the condition information of the processed page which specific setting information is stored in the job parameter storage section 105.

The apparatus control section 104B receives from the calculation section 111a difference between (a) an upper limit value (value stored in the upper limit value storage section 107) which is the processable number of sheets based on the condition information #1 and (b) the number of sheets actually processed after the image forming engine 20 obtained the upper limit value. The apparatus control section 104B performs the image forming process in a case where the inputted difference is not less than 1.

Moreover, the apparatus control section 104B orders the upper limit value inquiry section 108B to update the upper limit value in the upper limit value storage section 107, when the apparatus control section 104B detects a change in the condition information from the specific setting information including the condition information of the page stored in the job parameter storage section 105. Similarly, the apparatus control section 104B orders the updating section 109B to reset the count value in the count value storage section 106 to 0 (zero).

Figure 16:
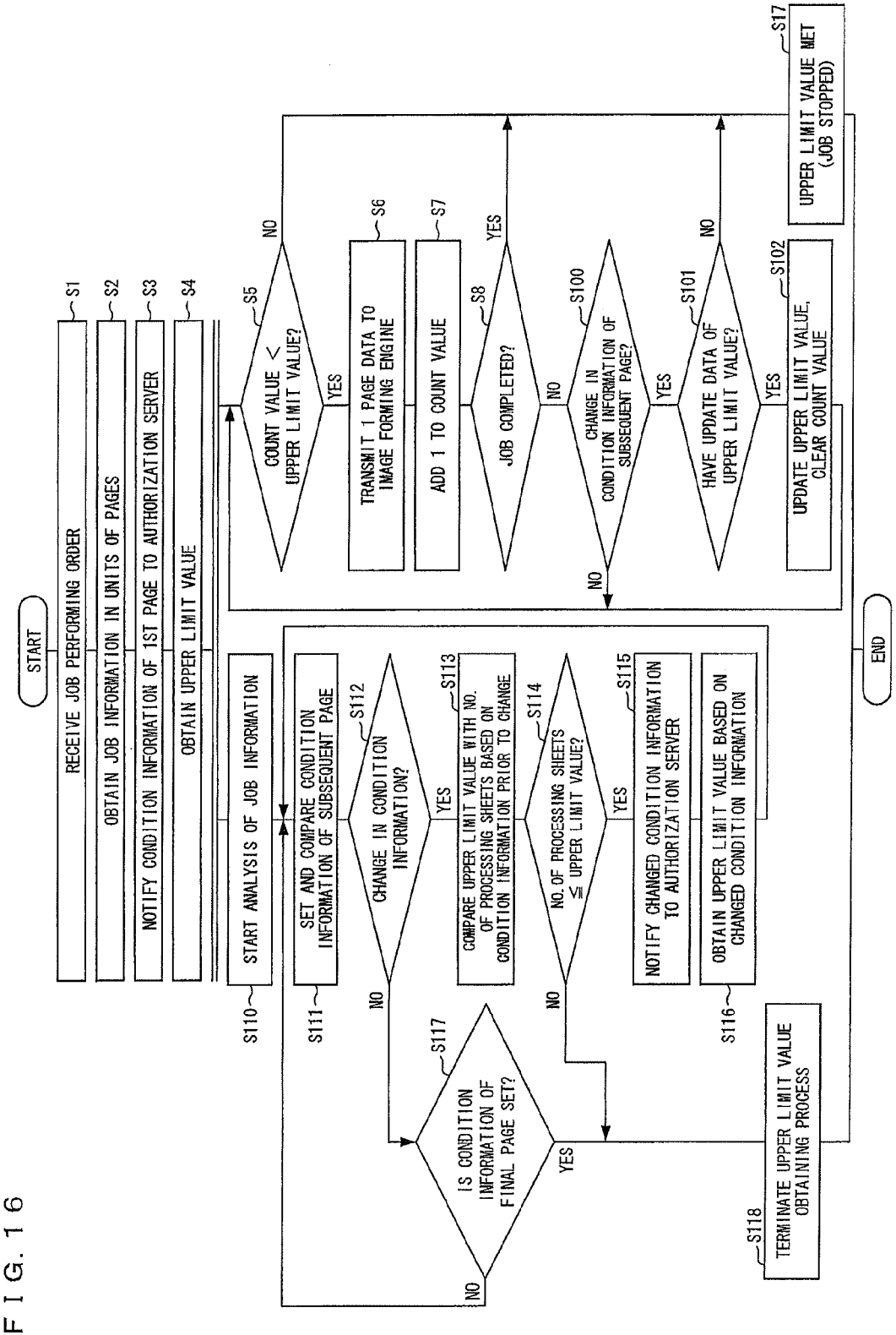
FIG. 16 is a flow chart illustrating a procedure of processes of a multifunction peripheral in the image forming system of FIG. 15, to perform an image forming job within a limit approved by the authorization server.

FIG. 16 is a flow chart illustrating a procedure of processes for performing an image forming job by the multifunction peripheral 100B within a limit approved by the authorization server 200.

The multifunction peripheral 100B, upon receiving a job performing order (S1), obtains job information in units of pages (S2). Out of the obtained job information, a specific setting condition of the 1st page is referred to, and condition information #1 of the $1^{st}$ page is notified to the authorization server 200 (S3). This causes the authorization server 200 to transmit a processable number of sheets corresponding to the condition information #1 of the $1^{st}$ page. The multifunction peripheral 100B receives this transmitted processable number of sheets, and obtains an upper limit value which is the processable number of sheets (S4). The obtained upper limit value is stored in the upper limit value storage section 107.

After the upper limit value of the condition information #1 of the $1^{st}$ page is obtained, the multifunction peripheral 100B performs the image forming process by the image forming engine 20 and the upper limit value obtaining process by the change detection section 110B, simultaneously.

First described is the upper limit value obtaining process. In S110, the change detection section 110B starts an analysis of the job information obtained in unit of sheets. The change detection section 110B first sets condition information of a subsequent page as a comparison target, and compares this with the condition information already set (in the initial comparison, the condition information #1 of the first page) (S111).

In S112, the comparison result of S111 is determined, and if the condition information of the subsequent page and the condition information already set are identical to each other, the process proceeds to S117 as having no change in the condition information, and determines whether or not the compared target is a final page. If the compared target is the condition information of the final page, the process proceeds to S118, and the upper limit value obtaining process is terminated.

On the other hand, if in S112 the comparison result of S111 is different between the condition information of the subsequent page and the condition information already set, the condition information is determined as being changed, and the process proceeds to S113. In S113, the number of processing sheets based on the condition information prior to the change (including the number of sheets already processed and the number of sheets to be processed, based on the condition information prior to the change) is compared with its upper limit value.

In S114, the comparison result of S113 is determined, and in a case where the number of processing sheets is not more than the upper limit value, the process proceeds to S115. In S115, the changed condition information is notified to the authorization server 200 together with the number of processing sheets processed based on the condition information prior to the change, and an upper limit value based on the changed condition information is obtained (S116). Thereafter, the process returns to S111.

On the other hand, in S114, if the number of processing pages exceeds the upper limit value, the process proceeds to S118 and the upper limit value obtaining process is terminated.

The processes from S111 to S116 are repeated until it is determined in S117 that the final page is set or is determined in S114 that the number of processing sheets exceed the upper limit value.

Next described is the image forming process. In S5, a count value (processed number of sheets) in the count value storage section 106 is compared with the upper limit value. Here, if the count value is not less than the upper limit value, the process proceeds to S17; the job is stopped due to the upper limit value being met, and the image forming process is terminated.

On the other hand, if the count value is smaller than the upper limit value, data of 1 page is transmitted to the image forming engine 20, to start the process (S6). After the data of 1 page is transmitted to the image forming engine 20, the count value of the count value storage section 106 is increased by 1 (S7).

Thereafter, determination is made on whether or not the job is completed (S8), and if it is determined as completed, the process proceeds to S17, and the image forming process is terminated.

On the other hand, if it is determined in S8 that the job is not completed, determination is made on whether or not there is a change in the condition information of the subsequent page (S100). In the multifunction peripherals 100 and 100A of Embodiments 1 and 2, respectively, the change detection section 110 detects the change in the condition information. In the multifunction peripheral 100B of the present embodiment, separately to the change detection section 110, the apparatus control section 104B also detects a change in the condition information.

If it is determined in S100 that there is no change in the condition information, the process returns to the process of S5. Further, as to the process of the subsequent page, if the count value is less than the upper limit value, data of the subsequent page is transmitted to the image forming engine 20. Thereafter, the processes from S5 to S100 are repeated until it is determined in S100 that there is a change in the condition information. While repeating these processes, if it is determined in S5 that the count value is not less than the upper limit value or is determined in S8 that the job is completed, the process proceeds to S17, and the image forming process is terminated.

If it is determined in S100 that there is a change in the condition information, it is further determined whether or not there is any update data of the upper limit value (S101). In S101, update data of the upper limit value is obtained in the upper limit value obtaining process, and in a case where there is a piece of update data of the upper limit value that has not been updated yet, it is determined as having update data. Note that if no update data of the upper limit value is obtained in the upper limit value inquiry section 108B in the upper limit value obtaining process, or if the upper limit value is already updated upon obtaining the update data, it is determined as not having the update data. In a case where it is determined as not having the update data, the process proceeds to S17, and this process is terminated.

On the other hand, if it is determined in S101 as having the update data, the upper limit value data stored in the upper limit value storage section 107 is to be updated, and the updating section 109B resets the count value of the count value storage section 106 to 0 (zero). Thereafter, the process returns to S5. Note that if there are a lot of points to change in the condition information detected by the change detection section 110B, and a plurality of update data of the upper limit value are obtained by the upper limit value inquiry section 108B, the upper limit value is updated to an upper limit value corresponding to a subsequent condition information, in accordance with the changing order of the condition information.

The processes from S5 through S102 are repeated until it is determined that the job is complete, or is determined in S101 that there is no update data of the upper limit value.

Other Modifications

The present invention is not limited to the description of the embodiments above, but may be altered by a skilled person within the scope of the claims. An embodiment based on a proper combination of technical means disclosed in different embodiments is encompassed in the technical scope of the present invention.

For instance, the foregoing Embodiment 2 describes a system in which the authorization server and the application server are connected to the multifunction peripheral via a communications network, however the present invention is similarly applicable in a case where these authorization server and application server are provided inside the multifunction peripheral.

In this case, a function for performing the functions of the application server and the authorization server are to be provided in the apparatus control section of the multifunction peripheral. For instance, a web server program is to be mounted on the multifunction peripheral, so that the application server function and the authorization server function are provided on this web server program. The application server authorization server and the apparatus control section provided inside the multifunction peripheral are communicable with each other by the same mechanism as the foregoing embodiments, by carrying out communication therebetween via the communication section with use of a local loop back.

Moreover, in the multifunction peripherals 100 and 100A, each of functional blocks included in the control section 50, i.e. the apparatus control section 104, the calculation section 111, the updating section 109, the change detection section 110, the upper limit value inquiry section 108, and the authorization inquiry section 115, may be configured by hardware logic or may be implemented by software using a CPU as follows.

Namely, the control section 50 of the multifunction peripherals 100 and 100A includes a CPU (central processing unit) and memory devices (memory media). The CPU (central processing unit) executes instructions in control programs implementing the functions. The memory devices include a ROM (read only memory) which contains programs, a RAM (random access memory) to which the programs are loaded, and a memory containing the programs and various data. The objective of the present invention can also be achieved by mounting to the multifunction peripheral 100 a computer-readable storage medium containing control program code (executable program, intermediate code program, or source program) for the multifunction peripheral 100, which is software implementing the aforementioned functions, in order for the computer (or CPU, MPU) of the control section 50 to retrieve and execute the program code contained in the storage medium.

The storage medium may be, for example, a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The multifunction peripherals 100 and 100A may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth, 802.11 wireless, HDR, mobile telephone network, satellite line, or terrestrial digital network. The present invention may also be accomplished by an aspect of a computer data signal embedded in a carrier wave, in which the program code is embodied electronically.

As described above, an image forming apparatus of the present invention is an image forming apparatus connectable with an authorization apparatus via a communications network, the image forming apparatus including: an apparatus control section configured to control an image forming section based on a processable number of sheets that an image forming process can be performed, to limit execution of an image forming job, the processable number of sheets being set by the authorization apparatus; an initial inquiry section configured to transmit, in executing the job, initial condition information related to a process to be performed to a first page of the job, to inquire the processable number of sheets in a case where the process is performed based on the initial condition information; a change detection section configured to detect a change in condition information in a page to be subsequently processed while the job is being executed; and a re-inquiry section configured to transmit, to the authorization apparatus, (i) a changed condition information and (ii) information of the number of sheets being processed based on a current condition information prior to the change in condition information, each time the change in condition information is detected by the change detection section, to inquire a processable number of sheets in a case where the process is performed based on the changed condition information, the apparatus control section starting execution of the job upon obtaining the processable number of sheets as a result of inquiring with the initial inquiry section, and in a case where a change in the condition information is detected by the change detection section, the apparatus control section forbids the process from being performed to a new recording sheet and causes the re-inquiry section to make an inquiry for a processable number of sheets based on the changed condition information to obtain the processable number of sheets based on the changed condition information, and as a result of obtaining the processable number of sheets, releases the forbidden state of the process to a new recording sheet, and the apparatus control section forbidding the process from being performed to a new recording sheet when a processed number of sheets after obtaining the processable number of sheets as a result of a latest inquiry meets the processable number of sheets obtained in the latest inquiry, while the job is being executed.

The condition information in the specification is, for example, setting conditions that the authorization apparatus requires for calculating a processable number of sheets out of setting conditions set to perform an image forming job such as color settings, sheet size, sheet type, and double-side settings.

According to the configuration, an initial inquiry section makes an inquiry for a processable number of pages based on the condition information of a $1^{st}$ page, and after the processable number of pages is obtained, no inquiry for the processable number of sheets is made to the authorization apparatus until a change in the condition information is detected by the change detection section. This allows for the image forming section to continuously perform the image forming, until a change in the condition information is detected.

Thereafter, when a change in the condition information is detected by the change detection section, the apparatus control section forbids the processing to a new recording sheet. This allows for preventing occurrence of a wasted recording sheet on which unnecessary image forming is performed.

Moreover, when a change in the condition information is detected by the change detection section, the re-inquiry section makes an inquiry of a processable number of sheets based on the changed condition information, to obtain a processable number of sheets corresponding to the changed condition information. At this time, the re-inquiry section also transmits process result information of the job processed based on the condition information prior to the change, to the authorization apparatus. This allows for obtaining an accurate processable number of sheets set in view of a processed result processed based on the condition information prior to the change.

Upon obtaining the processable number of sheets corresponding to the changed condition information as a result of making another inquiry, the apparatus control section releases the forbidden state of processing to a new recording sheet. This resumes the image forming.

Thereafter, when the number of sheets processed after obtaining the processable number of sheets as a result of the latest inquiry meets the processable number of sheets obtained as a result of the latest inquiry while the job is performed, the apparatus control section forbids the processing to a new recording sheet, and stops the job.

As such, in the configuration, the number of times an inquiry is made to the authorization apparatus for the processable number of sheets can be reduced to just the initial inquiry and whenever there is a change to the condition information. Hence, it is possible in most cases, except for some exceptions, to reduce the number of inquiries made to the authorization apparatus as compared to a configuration in which an inquiry of the processable number of sheets is made for each page. As a result, in a case where the number of sheets to be processed is great in amount, it is possible to perform the image forming process while holding down the reducing in performance of the image forming apparatus to the least possible. The exceptions are image forming jobs in which job information changes per page (e.g. copying or printing of distinctive documents for example which include black and white pages and color pages alternately).

In the image forming apparatus of the present invention, the change detection section may confirm whether or not there is the change in condition information each time the process is carried out for one page by the image forming section, in a case where a change in the condition information is detected by the change detection section, the apparatus control section forbids the process from being performed to a new recording sheet and causes the re-inquiry section to make an inquiry for a processable number of sheets based on the changed condition information to obtain the processable number of sheets based on the changed condition information, and as a result of obtaining the processable number of sheets, releases the forbidden state of the process to a new recording sheet, and the apparatus control section forbidding the process from being performed to a new recording sheet when a processed number of sheets after obtaining the processable number of sheets as a result of a latest inquiry meets the processable number of sheets obtained in the latest inquiry, while the job is being executed.

According to the configuration, an initial inquiry section makes an inquiry for a processable number of sheets based on the condition information of a $1^{st}$ page, and after the processable number of pages is obtained, no inquiry for the processable number of sheets is made to the authorization apparatus until a change in the condition information is detected by the change detection section. This allows for the image forming section to continuously perform the image forming, until a change in the condition information is detected.

Thereafter, when a change in the condition information is detected by the change detection section, the apparatus control section forbids the processing to a new recording sheet. This allows for preventing occurrence of a wasted recording sheet on which unnecessary image forming is performed.

Moreover, when a change in the condition information is detected by the change detection section, the re-inquiry section makes an inquiry of a processable number of sheets based on the changed condition information, to obtain a processable number of sheets corresponding to the changed condition information. At this time, the re-inquiry section also transmits, to the authorization apparatus, process result information of the job processed based on the condition information prior to the change. This allows for obtaining an accurate processable number of sheets set in view of a processed result processed based on the condition information prior to the change.

Upon obtaining the processable number of sheets corresponding to the changed condition information as a result of making another inquiry, the apparatus control section releases the forbidden state of processing to a new recording sheet. This resumes the image forming.

Thereafter, when the number of sheets processed after obtaining the processable number of sheets as a result of the latest inquiry meets the processable number of sheets obtained as a result of the latest inquiry while the job is performed, the apparatus control section forbids the processing to a new recording sheet, and stops the job.

As such, in the configuration, the number of times an inquiry is made to the authorization apparatus for the processable number of sheets can be reduced to just the initial inquiry and whenever there is a change to the condition information. Hence, it is possible in most cases, except for some exceptions, to reduce the number of inquiries made to the authorization apparatus as compared to a configuration in which an inquiry of the processable number of sheets is made for each page. As a result, in a case where the number of sheets to be processed is great in amount, it is possible to perform the image forming process while holding down the reducing in performance of the image forming apparatus to the least possible. The exceptions are image forming jobs in which job information changes per page (e.g. copying or printing of distinctive documents for example which include black and white pages and color pages alternately).

The image forming apparatus of the present invention may furthermore be configured in such a manner that the change detection section confirms whether or not there is the change in condition information, independently from the process performed by the image forming section, and the apparatus control section continually performs the process until the processed number of sheets meets the processable number of sheets that the process is permitted to be performed based on its respective condition information, and when the processed number of sheets meets the processable number of sheets that the process is permitted to be performed based on the respective condition information, the apparatus control section forbids feeding of a new recording sheet.

According to the configuration, the change detection section independently confirms whether or not there is a change in the condition information unrelated to the process performed by the image forming section. Hence, a response to an inquiry made by the re-inquiry section may already be received at a time when the image forming process performed by the image forming section reaches a condition change point. This allows for performing the image forming process while further preventing a decrease in the performance of the image forming apparatus.

The image forming apparatus of the present invention may furthermore be configured in such a manner that the image forming section is capable of performing multiprocessing, the multiprocessing performing a series of image forming processes to a plurality of sheets, respectively, simultaneously along a flow of the series of the image forming processes.

According to the configuration, processing to a new recording sheet is forbidden at a point in time when the change in the condition information is detected. Hence, in the multiprocessing, the process is continuously carried out to the recording sheet which is already fed and is in process by the image forming section. Therefore, the process can be resumed without delay together with the obtaining of a new processable number of sheets, and it is possible to avoid the decrease in performance of the image forming apparatus as much as possible.

It is further preferable that the image forming apparatus of the present invention is configured in such a manner that the condition information is settable based on an instruction from the authorization apparatus or through a user interface provided in the image forming apparatus.

The setting condition (condition information) required for the authorization apparatus to calculate a processable number of sheets depends on an environment in which the image forming apparatus is introduced. As such, by having a configuration which can freely set the setting condition based on an instruction from the authorization apparatus or with use of a user interface of the image forming apparatus, the setting condition can be made to be suitable to the environment in which the image forming apparatus is introduced.

It is preferable that the image forming apparatus of the present invention further includes a reporting section configured to, in a case where the execution of the job is completed or is stopped, report to the authorization apparatus process result information of the job at a time the job is completed or is stopped.

According to the configuration, the authorization apparatus can be aware of the processed number of sheets and the like at the time when the job is completed or is stopped. Hence, it is possible to confirm the processed number of sheets for each job, and return an accurate value in a case where a processable number of sheets is requested next time from the image forming apparatus.

The image forming apparatus of the present invention may further be configured including a continuation permission inquiry section configured to inquire the authorization apparatus of whether or not an application of the job is an application which allows the execution of the job regardless of limits, in a case where the processed number of sheets meets the processable number of sheets obtained as a result of the latest inquiry since after the image forming apparatus obtains that processable number of sheets obtained as the result of the latest inquiry, and if the application of the job is the application which allows the execution of the job regardless of the limits, the apparatus control section executing the job until the job is completed, whereas if the application is not the application which allows the execution of the job regardless of the limits, the apparatus control section stopping the execution of the job.

According to the configuration, when the processed number of sheets meets the processable number of sheets obtained from the authorization apparatus, the continuation permission inquiry section makes an inquiry to the authorization apparatus as to whether or not an application is applied that allows for performing the job regardless of limits. If it is permitted to continue, the job becomes executable exceeding its limits, thereby allowing for completing the job.

The image forming apparatus of the present invention further may be configured in such a manner that in a case where the application of the image forming job is the application which allows the execution of the job regardless of the limits and a setting condition of the process set at a time when the job is to be executed includes a condition not satisfying a second image forming condition set in advance, the apparatus control section changing the setting condition of the process to the second image forming condition, to execute the image forming.

It is preferable that the image forming apparatus of the present invention further is configured in such a manner that transmission of the condition information, transmission of process result information, or reception of the processable number of sheets is performed by a data command written in a markup language selected from the group consisting of: HTML, XML, WML, and XHTML.

According to the configuration, exchange of information is possible in a generic method.

In order to attain the object, an authorization apparatus of the present invention is an authorization apparatus connectable with an image forming apparatus via a communications network, the authorization apparatus setting a processable number of sheets based on information related to an image forming job being transmitted from the image forming apparatus, the authorization apparatus including: a limit information setting section configured to set the processable number of sheets and transmit the processable number of sheets to the image forming apparatus upon receiving an inquiry from the image forming apparatus for the processable number of sheets, the inquiry including condition information related to a process of the image forming job, the processable number of sheets being set based on the condition information or, in a case where information of a number of sheets being processed is transmitted together with the condition information, the processable number of sheets being set based on the condition information and the number of sheets being processed.

According to the configuration, after the limit information setting section receives an inquiry for a processable number of sheets, which inquiry includes the condition information, the limit information setting section sets the processable number of sheets of a case where the process is performed based on the condition information, and transmits this to the image forming apparatus. Hence, it is possible to construct an image forming system in combination with the image forming apparatus of the present invention.

The authorization apparatus of the present invention may be configured further including a money amount information obtaining section configured to obtain information of an amount of money inserted for executing the image forming job by the image forming apparatus, the limit information setting section setting the processable number of sheets based on (i) the condition information or, in a case where information of a number of sheets being processed is transmitted together with the condition information, the condition information and the information of the number of sheets being processed, and (ii) the information of the amount of money obtained by the money amount information obtaining section.

According to the configuration, the authorization apparatus sets the processable number of sheets corresponding to the condition information, based on an inserted amount of money. Hence, by combining the authorization apparatus with the image forming apparatus of the present invention, it is possible to construct an image forming system provided with a charging apparatus, which system can be provided in convenience stores and the like.

The authorization apparatus of the present invention may further be configured including an application information database configured to store a requirement of an application which allows for execution of a printing job regardless of limits; and a continuation permission determination section configured to, upon receiving an inquiry from the image forming apparatus of whether or not it is possible to continue on with the job even after the processable number of sheets is met, determine whether or not an application of the image forming job satisfies the requirement with reference to the application information database, and transmit a determination result.

According to the configuration, after the continuation permission determination section receives from the image forming apparatus a continuation permission inquiry, the continuation permission determination section determines whether or not the application of the job meets the requirement by referring to the application information database, and transmits this determination result to the image forming apparatus. Hence, it is possible to construct an image forming system which makes a continuation permission inquiry, in combination with the image forming apparatus of the present invention which makes a continuation permission inquiry.

In this case, the requirement of the application stored in the application is a use condition of the application stored associated with a corresponding application name, and the continuation permission determination section may be configured so as to permit to perform image forming in a case where the use condition is charged, and not allowing to perform image forming in a case where the use condition is free of charge.

Moreover, the requirement of the application stored in the application information database is an image forming condition of the application stored associated with a corresponding application name, and the continuation permission determination section permitting the image forming in a case where setting information of image forming that is set at a time when executing the image forming job satisfies an image forming condition, and not allowing the image forming when the setting information does not satisfy the image forming condition.

Moreover, the requirement of the application stored in the application information is a domain name to which an application belongs, where the application according to the image forming job is executed is registered, and not permitting the printing if the domain name of the application server is not registered.

Moreover, the scope of the present invention also includes an image forming system constructed of the image forming apparatus and an authorization apparatus suitable for the image forming apparatus.

Moreover, the image forming apparatus and the authorization apparatus may be implemented by a computer. In this case, a program which implements the image forming apparatus and the authorization apparatus by use of a computer by causing the computer to operate as each of the sections, and a computer-readable recording medium storing the program, are also included in the scope of the present invention.

REFERENCE SIGNS LIST 20 image forming engine (image forming section)
30 image reading unit
100 multifunction peripheral (image forming apparatus)
100A multifunction peripheral (image forming apparatus)
100B multifunction peripheral
104 apparatus control section
108 upper limit value inquiry section (initial inquiry section, re-inquiry section, reporting section)
110 change detection section
200 authorization server (authorization apparatus)
202 upper limit value setting section (limit information setting section)
203 balance management section (money amount information obtaining section)
400 authorization server (authorization apparatus)
403 upper limit value setting section (limit information setting section, continuation permission determination section)

The invention claimed is:

1. An image forming apparatus connectable with an authorization apparatus via a communications network, the image forming apparatus comprising:
an apparatus control section configured to control an image forming section based on a processable number of sheets that an image forming process can be performed, to limit execution of an image forming job, the processable number of sheets being set by the authorization apparatus;
an initial inquiry section configured to transmit, in executing the job, initial condition information related to a process to be performed to a first page of the job, to inquire the processable number of sheets in a case where the process is performed based on the initial condition information;
a change detection section configured to detect a change in condition information while the job is being executed; and
a re-inquiry section configured to transmit, to the authorization apparatus, (i) a changed condition information and (ii) information of the number of sheets being processed based on a current condition information prior to the change in condition information, each time the change in condition information is detected by the change detection section, to inquire a processable number of sheets in a case where the process is performed based on the changed condition information,
the apparatus control section starting execution of the job upon obtaining the processable number of sheets as a result of inquiring with the initial inquiry section, and in a case where, while the job is executed, a processed number of sheets meets the processable number of sheets that is approved for performing the process based on the current condition information, the apparatus control section forbidding the image forming apparatus to perform the process to a new recording sheet and stopping the job.

2. The image forming apparatus according to claim 1, wherein:
the change detection section confirms whether or not there is the change in condition information each time the process is carried out for one page by the image forming section,
in a case where a change in the condition information is detected by the change detection section, the apparatus control section forbids the process from being performed to a new recording sheet and causes the re-inquiry section to make an inquiry for a processable number of sheets based on the changed condition information to obtain the processable number of sheets based on the changed condition information, and as a result of obtaining the processable number of sheets, releases the forbidden state of the process to a new recording sheet, and
the apparatus control section forbidding the process from being performed to a new recording sheet when a processed number of sheets after obtaining the processable number of sheets as a result of a latest inquiry meets the processable number of sheets obtained in the latest inquiry, while the job is being executed.

3. The image forming apparatus according to claim 1, wherein:
the change detection section confirms whether or not there is the change in condition information, independently from the process performed by the image forming section, and
the apparatus control section continually performs the process until the processed number of sheets meets the processable number of sheets that the process is permitted to be performed based on its respective condition information, and when the processed number of sheets meets the processable number of sheets that the process is permitted to be performed based on the respective condition information, the apparatus control section forbids feeding of a new recording sheet.

4. An image forming system comprising: the image forming apparatus as set forth in claim 1 further including an apparatus connectable with the image forming apparatus via a communications network, the authorization apparatus setting a processable number of sheets based on information related to an image forming job being transmitted from the image forming apparatus, the authorization apparatus comprising:

a limit information setting section configured to set the processable number of sheets and transmit the processable number of sheets to the image forming apparatus upon receiving an inquiry from the image forming apparatus for the processable number of sheets, the inquiry including condition information related to a process of the image forming job, the processable number of sheets being set based on the condition information or, in a case where information of a number of sheets being processed is transmitted together with the condition information, the processable number of sheets being set based on the condition information and the number of sheets being processed.

5. A non-transitory computer-readable recording medium in which a program is stored, the program causing a computer to function as the apparatus control section, the initial inquiry section, the change detection section, or the re-inquiry section of an image forming apparatus as set forth in claim 1.

\* \* \* \* \*